United States Patent
Mahamuni et al.

(10) Patent No.: US 11,656,932 B2
(45) Date of Patent: May 23, 2023

(54) PREDICTIVE BATCH JOB FAILURE DETECTION AND REMEDIATION

(71) Applicant: KYNDRYL, INC., New York, NY (US)

(72) Inventors: Amol Bhaskar Mahamuni, Bangalore (IN); Sundaravelu Shanmugam, Bangalore (IN); Joel Augustine George, Mysore (IN)

(73) Assignee: KYNDRYL, INC., New York, NY (US)

( * ) Notice: Subject to any disclaimer, the term of this patent is extended or adjusted under 35 U.S.C. 154(b) by 164 days.

(21) Appl. No.: 17/379,583

(22) Filed: Jul. 19, 2021

(65) Prior Publication Data
US 2023/0018199 A1    Jan. 19, 2023

(51) Int. Cl.
*G06F 11/00*    (2006.01)
*G06F 11/07*    (2006.01)
(Continued)

(52) U.S. Cl.
CPC ........ *G06F 11/0793* (2013.01); *G06F 9/4881* (2013.01); *G06F 11/0706* (2013.01);
(Continued)

(58) Field of Classification Search
CPC ............. G06F 11/0703; G06F 11/0706; G06F 11/0751; G06F 11/0766; G06F 11/0772;
(Continued)

(56) References Cited

U.S. PATENT DOCUMENTS

| | | |
|---|---|---|
| 8,990,820 B2 | 3/2015 | Plancarte |
| 10,025,659 B2* | 7/2018 | Shinde ............... G06F 11/3495 |
| 10,296,377 B1 | 5/2019 | Jonsson |

(Continued)

OTHER PUBLICATIONS

R. Kumar et al., "The Mystery of the Failing Jobs: Insights from Operational Data from Two University-Wide Computing Systems," 2020 50th Annual IEEE/IFIP International Conference on Dependable Systems and Networks (DSN), Valencia, Spain, 2020, pp. 158-171, doi: 10.1109/DSN48063.2020.00034. (Year: 2020).*

(Continued)

*Primary Examiner* — Anthony J Amoroso
(74) *Attorney, Agent, or Firm* — Erik C. Swanson, Esq.; Blanche E. Schiller, Esq.; Kyndryl, Inc.

(57) ABSTRACT

Systems, methods, and computer programming products for predicting, preventing and remediating failures of batch jobs being executed and/or queued for processing at future scheduled time. Batch job parameters, messages and system logs are stored in knowledge bases and/or inputted into AI models for analysis. Using predictive analytics and/or machine learning, batch job failures are predicted before the failures occur. Mappings of processes used by each batch job, historical data from previous batch jobs and data identifying the success or failure thereof, builds an archive that can be refined over time through active learning feedback and AI modeling to predictively recommend actions that have historically prevented or remediated failures from occurring. Recommended actions are reported to the system administrator or automatically applied. As job failures occur over time, mappings of the current system log to logs for the unsuccessful batch jobs help the root cause analysis becomes simpler and more automated.

20 Claims, 9 Drawing Sheets

(51) Int. Cl.
G06N 5/022      (2023.01)
G06F 9/48       (2006.01)
G06F 11/30      (2006.01)
G06F 11/22      (2006.01)
G06N 3/044      (2023.01)

(52) U.S. Cl.
CPC ........ *G06F 11/079* (2013.01); *G06F 11/0766* (2013.01); *G06F 11/0772* (2013.01); *G06F 11/0778* (2013.01); *G06F 11/0787* (2013.01); *G06F 11/2257* (2013.01); *G06F 11/302* (2013.01); *G06F 11/3051* (2013.01); *G06N 3/044* (2023.01); *G06N 5/022* (2013.01)

(58) Field of Classification Search
CPC ............. G06F 11/0778; G06F 11/0787; G06F 11/079; G06F 11/0793; G06F 11/3051; G06F 9/4881; G06F 9/5038; G06N 5/02; G06N 5/022; G06N 5/046; G06N 5/047
See application file for complete search history.

(56) References Cited

U.S. PATENT DOCUMENTS

| | | | |
|---|---|---|---|
| 2015/0220373 | A1 | 8/2015 | Chen |
| 2017/0039530 | A1 | 2/2017 | Natu |
| 2017/0046217 | A1* | 2/2017 | Shinde ................ G06F 11/3495 |
| 2017/0052814 | A1 | 2/2017 | Aguiar |
| 2021/0342214 | A1* | 11/2021 | Madawat ............ G06F 11/3006 |

OTHER PUBLICATIONS

M. Soualhia, et al., "Predicting Scheduling Failures in the Cloud: A Case Study with Google Clusters and Hadoop on Amazon EMR," IEEE 17th Int'l Conf. on High Perf. Comp. and Comm., IEEE 7th Int'l Symp. on Cyber. Safety and Security, and IEEE 12th Int'l Conf. on Emb. SW and Sys., IEEE, 2015, pp. 58-65 (Year: 2015).*

X. Chen, C.-D. Lu and K. Pattabiraman, "Failure Prediction of Jobs in Compute Clouds: A Google Cluster Case Study," 2014 IEEE International Symposium on Software Reliability Engineering Workshops, Naples, Italy, 2014, pp. 341-346, doi: 10.1109/ISSREW.2014.105. (Year: 2014).*

Gao, Jiechao, Haoyu Wang, and Haiying Shen. "Task failure prediction in cloud data centers using deep learning." IEEE transactions on services computing 15, No. 3 (2020): 1411-1422. (Year: 2020).*

M. Jassas and Q. H. Mahmoud, "Failure Analysis and Characterization of Scheduling Jobs in Google Cluster Trace," IECON 2018—44th Annual Conference of the IEEE Industrial Electronics Society, Washington, DC, USA, 2018, pp. 3102-3107, doi: 10.1109/IECON.2018.8592822. (Year: 2018).*

T. Islam and D. Manivannan, "Predicting Application Failure in Cloud: A Machine Learning Approach," 2017 IEEE International Conference on Cognitive Computing (ICCC), Honolulu, HI, USA, 2017, pp. 24-31, doi: 10.1109/IEEE.ICCC.2017.11. (Year: 2017).*

"Mainframe Batch Analytics with Machine Learning—Adding a New Workload Based on System Resource Availability", An IP.com Prior Art Database Technical Disclosure, Authors et al.: Disclosed Anonymously, IP.com No. IPCOM000259108D, IP.com Electronic Publication Date: Jul. 12, 2019, 5 pages.

Li et al., "A Novel Classification Model to Predict Batch Job Failures in Co-located Cloud", 2020 IEEE 26th International Conference on Parallel and Distributed Systems (ICPADS), DOI 10.1109/ICPADS51040.2020.00080, pp. 577-584.

Mell et al., "The NIST Definition of Cloud Computing", Recommendations of the National Institute of Standards and Technology, Special Publication 800-145, Sep. 2011, 7 pages.

* cited by examiner

PREDICTIVE BATCH JOB FAILURE DETECTION AND REMEDIATION

TECHNICAL FIELD

The present disclosure relates generally to the field of batch processing, machine learning and predictive analytics and more particularly to predictively identifying, remediating and preventing occurrences of batch job failures.

BACKGROUND

Batch jobs may refer to scheduled programs or applications are assigned to run and be executed by a computing system with less or without any further user interaction. Often batch jobs include tasks that may only be executed periodically, or when resource usage of the computing system is low. Batch jobs often process large amounts of information such as log files, database records, or images. Batch applications can specify a set of steps and execution order, and different types of batch frameworks may specify additional elements, such as decision elements or groups of steps that may run in parallel. Once batch jobs are submitted, the job enters into a queue where the job is scheduled for execution and/or waits until the computing system is ready to process the job. If the job queue comprises many jobs waiting to be processed, the computing system may process the jobs in chronological order, by assigned job priorities and/or system resource availability. Batch jobs are frequently used to automate tasks that may need to be performed on a regular basis but may otherwise not necessarily need to occur daily or require user interaction. For example, billing, report generation, data format conversion and image processing.

SUMMARY

Embodiments of the present disclosure relate to a computer-implemented method, an associated computer system and computer program products for predicting, preventing and/or remediating batch job failures, either currently being processed or queued for processing at a later point in time. The computer-implemented method comprises the steps of creating, by a processor, a knowledge base including an archive of failed batch job histories comprising time series data of workflow logs, messages and invoked processes associated with failed batch jobs; generating, by the processor, a table of processes mapping processes invoked by batch jobs to the workflow logs and messages associated with the batch jobs; monitoring, by the processor, the messages, the workflow logs and process-level information of the batch jobs being executed; matching, by the processor, error messages or process failures of a current system log to error messages and the invoked processes of the batch job histories contained in the knowledge base; displaying, by the processor, a root cause analysis of the error messages or process failures of the current system log and a recommended remediation action for alleviating the batch job failure; and updating, by the processor, the knowledge base with feedback comprising results of applying the recommended remediation action.

BRIEF DESCRIPTION OF THE DRAWINGS

The drawings included in the present disclosure are incorporated into, and form part of, the specification. The drawings illustrate embodiments of the present disclosure and, along with the description, explain the principles of the disclosure. The drawings are only illustrative of certain embodiments and do not limit the disclosure.

DETAILED DESCRIPTION

Figure 1:
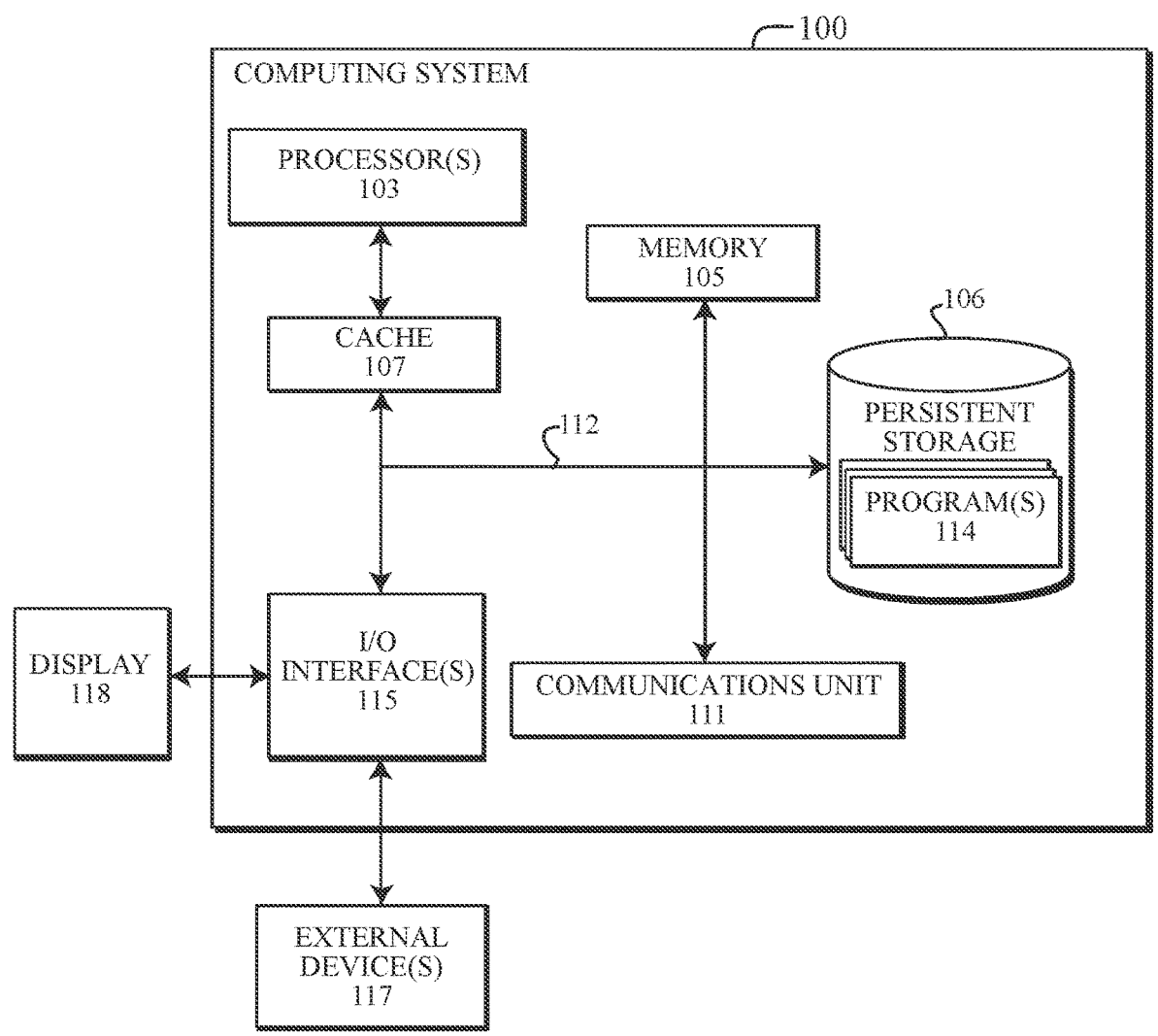
FIG. 1 depicts a block diagram illustrating internal and external components of an embodiment of a computing system in which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described are in order to best explain the principles of the disclosure, the practical applications and to enable others of ordinary skill in the art to understand the disclosure for various embodiments with various modifications as are suited to the particular use contemplated.

Overview

Millions of processing jobs are executed by batch processing systems, such as mainframe computing systems. These batch jobs are executed in accordance with business requirements and examples of these batch jobs can include jobs or tasks pertaining to purchase order creation, production supply chain, stock exchange reports, etc. Batch jobs often function as a backbone of a business's functionality and in view of such importance, the processing of batch jobs often must be completed within planned windows of times, per certain requirements of service level agreements (SLA). Any failures of batch jobs can result in service disruptions, breaches of an SLA and costly penalties. Under normal processing of batch jobs, when a batch job fails, a system admin manually identifies why the failure occurred by looking at system logs and error messages in order to identify the issue and take remedial action(s). Once the root cause of the batch job failure is identified and corrected, the system administrator must typically rerun the job again. Currently, there is no easy way to manually determine if other jobs being executed by the processing system will also fail. Completely manual fixes performed by the system admin are subjective, based on judgment and the experience of the system admin, and can be prone to errors.

Embodiments of the present disclosure recognize that there are major issues that arise from batch jobs failing and requiring a system's administrator to manually fix the cause of the problem and re-run the failed batch jobs. Firstly, failed batch jobs being processed by a mainframe results in a measurable loss of mainframe MIPs (millions of instructions per second), wherein the longer the batch jobs are being processed before failing or being aborted, the larger the MIPs loss is and therefore more costly. Moreover, since failed batch jobs need to be re-run after addressing the underlying cause of the job failure, batch jobs failing longer in the job cycle in conjunction with having to re-run the previously failed batch job again, increases the likelihood that an SLA may be breached. Currently, there does not exist a system, method or computer program that is able to predictively analyze batch jobs that are being executed or queued for processing and recommend proactive intervention by a system admin or operator to ensure business continuity within the SLA window of time and performance requirements.

Embodiments of the present disclosure leverage the use of predictive analytics and machine learning with the processing of batch application jobs to analyze batch job parameters and predict batch job failures for both currently running batch jobs and batch jobs within a job queue which have not yet been picked up for processing. Furthermore, the use of predictive analytics and/or machine learning allows the disclosed embodiments discussed herein to address batch job failures before the failures occur and before a batch job is even picked up by the computing system for processing. As a result, the embodiments discussed herein not only save costs associated with mainframe MIPs for currently running batch jobs, but also save MIPs in potential future failures of other batch jobs awaiting processing the job queue, therefore achieving improved SLA performance, cost savings and a reduction in the disruption of business.

Embodiments of the present disclosure can predict batch job failures for currently executing batch jobs and scheduled batch jobs, by identifying dependent processes and analyzing constraints of the current job being executed, using both anomaly detection and/or a complex correlation between system logs and collected metrics. In the exemplary embodiments described herein, one or more knowledge bases can be established and teach the system how to identify potential batch job failures of invoked processes using historical data from previous batch jobs. Embodiments of knowledge bases can be created containing records comprising time series data that includes a history of successful batch jobs and messages associated therewith, time stamps and average time for the job to be successful. A second knowledge base or corpus may be established comprising time series data for unsuccessful or failed batch jobs. The second knowledge base can include logs of the unsuccessful jobs, and corresponding error messages for these historically identified failed jobs. A third set of data comprising a table of processes being invoked by each batch job can also be created. The table of processes may map the running processes for each job to messages and logs. As errors messages occur and are added to the knowledge base, the appropriate and/or most probable resolutions can be recorded along with the error. An archive of the remediation for unsuccessful job failures can be built and refined over time through active learning feedback to predictively prevent and recommend actions that can prevent failures from occurring and/or recommend remediation actions to the system administrator. As job failures occur for a running batch job, root cause analysis becomes simpler and more automated because the map of the current system log to logs for the unsuccessful batch jobs can help determine the root cause of failures using the archived data of the knowledge bases. Historically useful remediation steps can be automatically recommended when similar root causes are identified for batch jobs that may be failing for the same reasons as historically failed and remediated batch jobs mapped to the same processes in the table of processes.

Moreover, based on historical data collected and archived, batch jobs in the job queue can be analyzed and predictions can be made whether or not the queued jobs are expected to fail. Potential batch job failures can be proactively flagged, and remediation steps can be recommended or automatically implemented to alleviate the potential source of the anticipated failure. For example, if a queued batch job is mapped in the table of processes to invoke a faulty process that has caused previous batch jobs to fail, the queued job that is scheduled to invoke the faulty process could also be anticipated to fail, unless a remediation measure is taken to alleviate the underlying cause of the faulty process. Appropriate action on the batch job expected to fail can include terminating the entire batch, restarting a failing batch, holding batch execution, fixing the failing process and allowing the remainder of the batch to run thereafter.

Embodiments of this disclosure may also integrate the use of artificial intelligence or machine learning (referred to generally herein as "cognitive computing") to analyze and predict batch job failures of batch jobs being executed and/or in queue. The complex analysis using cognitive computing techniques can be performed in addition to the system log and gathered metric analysis described herein. Embodiments may input data into an AI engine and use continuous or active learning to fine tune a dynamic model capable of predicting batch job failures. For example, generating a model using the dynamic nature of a code path taken by each job, and the processes that are expected to be invoked for each task of the batch job. Time series data for the known tasks can be created, capturing code paths invoked by the batch job and in turn train a recurrent neural network (RNN)/long short-term memory (LSTM) model capable of predicting failures for a given batch job or queued job based on the processes expected to be invoked.

Computing System

FIG. 1 illustrates a block diagram of an embodiment of a computing system 100, which may be a simplified example of a computing device (i.e., a physical bare metal system or virtual system) capable of performing the computing operations described herein for predicting, preventing and/or remediating batch job failures. Computing system 100 may be representative of the one or more computing systems or devices implemented as part of computing environments depicted in FIGS. 2-5, in accordance with the embodiments of the present disclosure and further described below in detail. It should be appreciated that FIG. 1 provides only an illustration of one implementation of a computing system 100 and does not imply any limitations regarding the environments in which different embodiments may be implemented. In general, the components illustrated in FIG. 1 may be representative of any electronic device, either physical or virtualized, capable of executing machine-readable program instructions for processing jobs of batch applications.

Although FIG. 1 shows one example of a computing system 100, a computing system 100 may take many different forms, including bare metal computer systems, virtualized computer systems, container-oriented architecture, microservice-oriented architecture, etc. For example, computing system 100 can take the form of real or virtualized systems, including but not limited to desktop computer systems, laptops, notebooks, tablets, servers, client devices, network devices, network terminals, thin clients, thick clients, kiosks, mobile communication devices (e.g., smartphones), multiprocessor systems, microprocessor-based systems, minicomputer systems, mainframe computer systems, smart devices, and/or Internet of Things (IoT) devices. The computing systems 100 can operate in a local computing environment, networked computing environment, a containerized computing environment comprising one or more pods or clusters of containers, and/or a distributed cloud computing environment, which can include any of the systems or devices described herein and/or additional computing devices or systems known or used by a person of ordinary skill in the art.

Computing system 100 may include communications fabric 112, which can provide for electronic communications among one or more processor(s) 103, memory 105, persistent storage 106, cache 107, communications unit 111, and one or more input/output (I/O) interface(s) 115. Communications fabric 112 can be implemented with any architecture designed for passing data and/or controlling information between processor(s) 103 (such as microprocessors, CPUs, and network processors, etc.), memory 105, external devices 117, and any other hardware components within a computing system 100. For example, communications fabric 112 can be implemented as one or more buses, such as an address bus or data bus.

Memory 105 and persistent storage 106 may be computer-readable storage media. Embodiments of memory 105 may include random access memory (RAM) and/or cache 107 memory. In general, memory 105 can include any suitable volatile or non-volatile computer-readable storage media and may comprise firmware or other software programmed into the memory 105. Program(s) 114, software applications, processes, services, and installed components thereof, described herein, may be stored in memory 105 and/or persistent storage 106 for execution and/or access by one or more of the respective processor(s) 103 of the computing system 100.

Persistent storage 106 may include a plurality of magnetic hard disk drives, solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communications unit 111 provides for the facilitation of electronic communications between computing systems 100. For example, between one or more computer systems or devices via a communication network. In the exemplary embodiment, communications unit 111 may include network adapters or interfaces such as a TCP/IP adapter cards, wireless interface cards, or other wired or wireless communication links. Communication networks can comprise, for example, copper wires, optical fibers, wireless transmission, routers, load balancers, firewalls, switches, gateway computers, edge servers, and/or other network hardware which may be part of, or connect to, nodes of the communication networks including devices, host systems, terminals or other network computer systems. Software and data used to practice embodiments of the present disclosure can be downloaded to the computing systems 100 operating in a network environment through communications unit 111 (e.g., via the Internet, a local area network, or other wide area networks). From communications unit 111, the software and the data of program(s) 114 can be loaded into persistent storage 116.

One or more I/O interfaces 115 may allow for input and output of data with other devices that may be connected to computing system 100. For example, I/O interface 115 can provide a connection to one or more external devices 117 such as one or more smart devices, IoT devices, recording systems such as camera systems or sensor device(s), input devices such as a keyboard, computer mouse, touch screen, virtual keyboard, touchpad, pointing device, or other human interface devices. External devices 117 can also include portable computer-readable storage media such as, for example, thumb drives, portable optical or magnetic disks, and memory cards. I/O interface 115 may connect to human-readable display 118. Human-readable display 118 provides a mechanism to display data to a user and can be, for example, computer monitors or screens. For example, by displaying data as part of a graphical user interface (GUI). Human-readable display 118 can also be an incorporated display and may function as a touch screen, such as a built-in display of a tablet computer.

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

System for Predicting, Preventing and Remediating Batch Job Failures

It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the Figures, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

Referring to the drawings, FIG. 2 to FIG. 5 depict an approach that can be executed using one or more computing systems 100 operating within a computing environment 200, 300, 400 and variations thereof, to implement systems, methods, and computer program products for predicting, preventing and remediating batch job failures of batch applications 210. Embodiments of computing environments 200, 300, 400 may include one or more computing systems 100 interconnected via a computer network 250. In the exemplary embodiments depicted in FIGS. 2-3. the computing systems 100 connected to the computing network 250 may be specialized systems or devices that may include, but are not limited to, the interconnection of one or more mainframe 201, remote workstation(s) 247, terminal(s) and network-accessible hosts maintaining one or more web page(s) 245, applications, services, etc. over a network addressable connection that may be fetchable; for example, using HTTP or HTTPS protocols. While a mainframe 201, remote workstation(s) 247, terminal(s) 249 and web page(s) 245 may be interconnected via network 250 as shown, other types of computing systems and devices may be interconnected as well and may be substituted for the computing systems depicting in the drawings. For example, instead of a mainframe 201 connecting to remote workstations 247 and terminal(s) 249, another type of host computing systems, nodes, server or a computing system emulating a mainframe environment, may be connected to one or more client devices or computing systems and performing batch job processing for batch applications 210.

Embodiments of the specialized computing systems or devices exemplified in FIGS. 2-5 may not only comprise the elements of the systems and devices depicted in the exemplary embodiments of FIGS. 2-5 as shown, but the specialized computing systems depicted may further incorporate one or more elements of computing system 100 shown in FIG. 1 and described above. Although not shown in the Figures, one or more elements of computing system 100 may be integrated into the embodiments of mainframe 201, remote workstation(s) 247, terminal(s) 249 and/or the one or more systems, servers, and/or devices hosting or maintaining network-accessible web page(s) 245, applications and services, wherein the components integrated into the specialized computing systems include (but are not limited to) one or more processor(s) 103, program(s) 114, memory 105, persistent storage 106, cache 107, communications unit 111, I/O interface(s) 115, external device(s) 117 and human-readable display 118.

Embodiments of network 250 may be constructed using wired, wireless or fiber-optic connections. Remote workstation(s) 247, terminal(s) 249 and web page(s) 245 may connect and communicate with mainframe 201 (or any other type of host computing system or server), whether real or virtualized, over the network 250 via a communications unit 111, such as a network interface controller, network interface card, network transmitter/receiver or other network communication device capable of facilitating communication across network 250. In some embodiments of computing environments 200, 300, 400, one or more mainframe 201, remote workstation(s) 247, terminal(s) 249 and hosts maintaining web page(s) 245, may represent computing systems 100 utilizing clustered computing and components acting as a single pool of seamless resources when accessed through network 250. For example, such embodiments can be used in a datacenter, cloud computing network, storage area network (SAN), and network-attached storage (NAS) applications.

Embodiments of the communications unit 111 such as the network transmitter/receiver may implement specialized electronic circuitry, allowing for communication using a specific physical layer and a data link layer standard. For example, Ethernet, Fiber channel, Wi-Fi or other wireless radio transmission signals, cellular transmissions or Token Ring to transmit data between mainframe 201, remote workstation(s) 247, terminal(s) 249 and the one or more systems, servers, and/or devices hosting or maintaining web pages(s) 245 connected to network 250. Communications unit 111 may further allow for a full network protocol stack, enabling communication over network 250 to groups of computing systems 100 linked together through communication channels of network 250. Network 250 may facilitate communication and resource sharing among mainframe 201, remote workstation(s) 247, terminal(s) 249 and the one or more systems, servers, and/or devices hosting or maintaining web pages(s) 245 connected to the network 250. Examples of network 250 may include a local area network (LAN), home area network (HAN), wide area network (WAN), backbone networks (BBN), peer to peer networks (P2P), campus networks, enterprise networks, the Internet, cloud computing networks, wireless communication networks and any other network known by a person skilled in the art.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
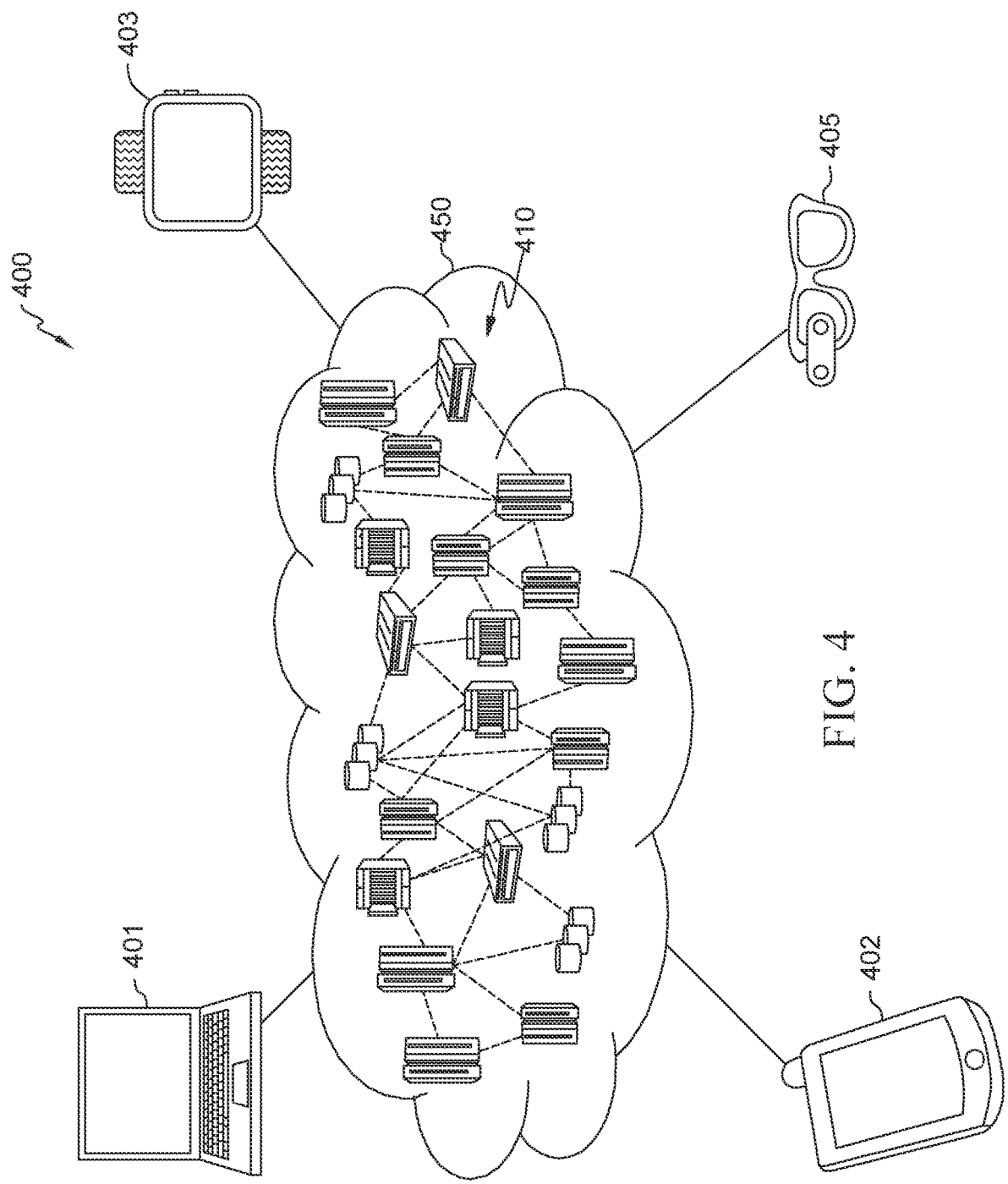
FIG. 4 depicts a block diagram illustrating a cloud computing environment in accordance with the present disclosure.

Referring to the drawings, FIG. 4 is an illustrative example of a cloud computing environment 400. As shown, cloud computing environment 400 includes one or more cloud computing nodes 410 with which end user devices may be used by cloud consumers, to access one or more software products, services, applications, and/or workloads provided by cloud service providers of the cloud network 450. Examples of the end user devices are depicted and may include devices such as a smartphone 402 or cellular telephone, desktop computers, laptop computer 401, smart devices such as smartwatch 403 and smart glasses 405. Nodes 410 may communicate with one another and may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of end user devices shown in FIG. 4 are intended to be illustrative only and that computing nodes 410 of cloud computing environment 400 can communicate with any type of computerized device over any type of network and/or network addressable connection (e.g., using a web browser).

Figure 5:
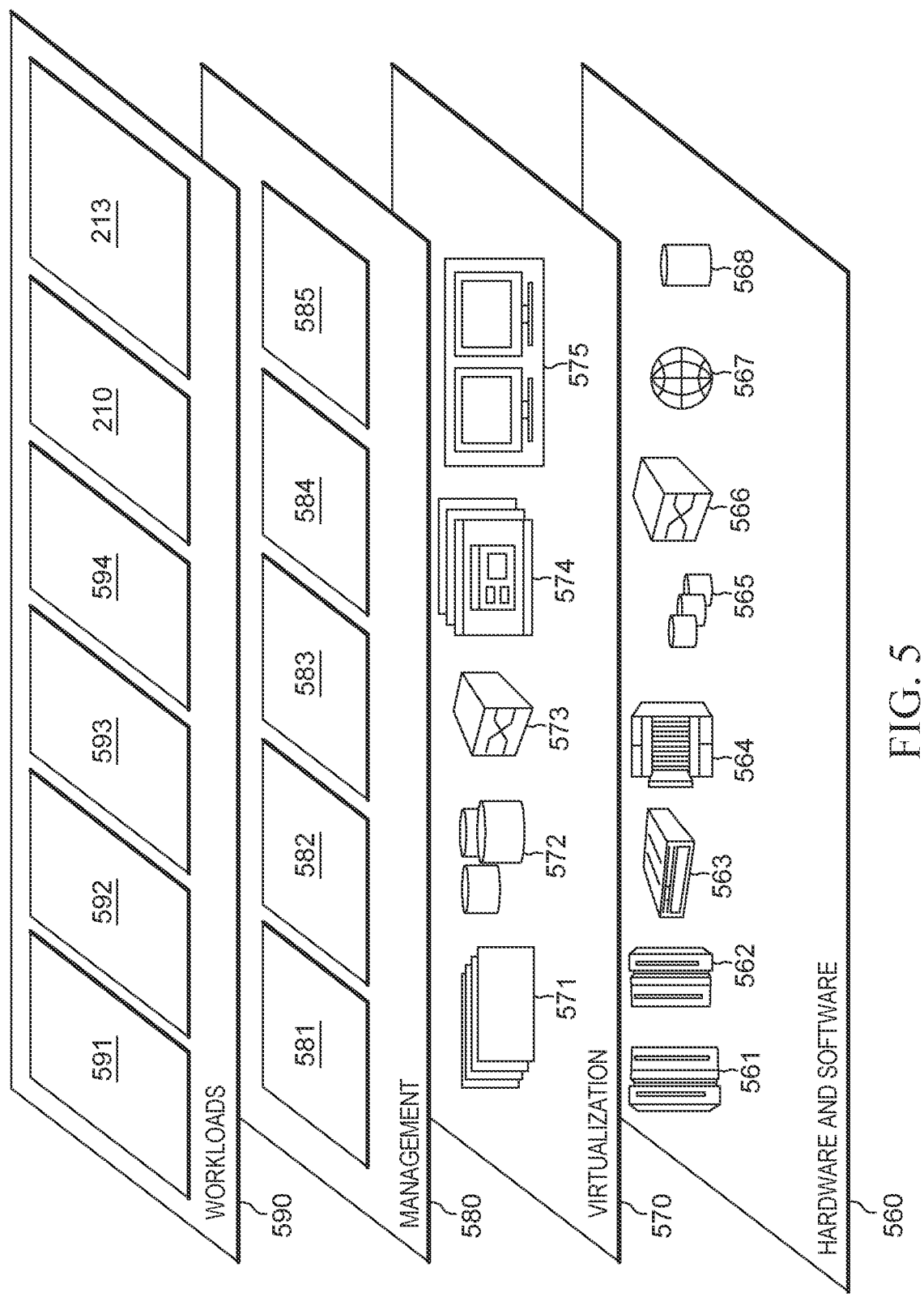
FIG. 5 depicts an embodiment of abstraction model layers of a cloud computing environment in accordance with the present disclosure.
Figure 6A:
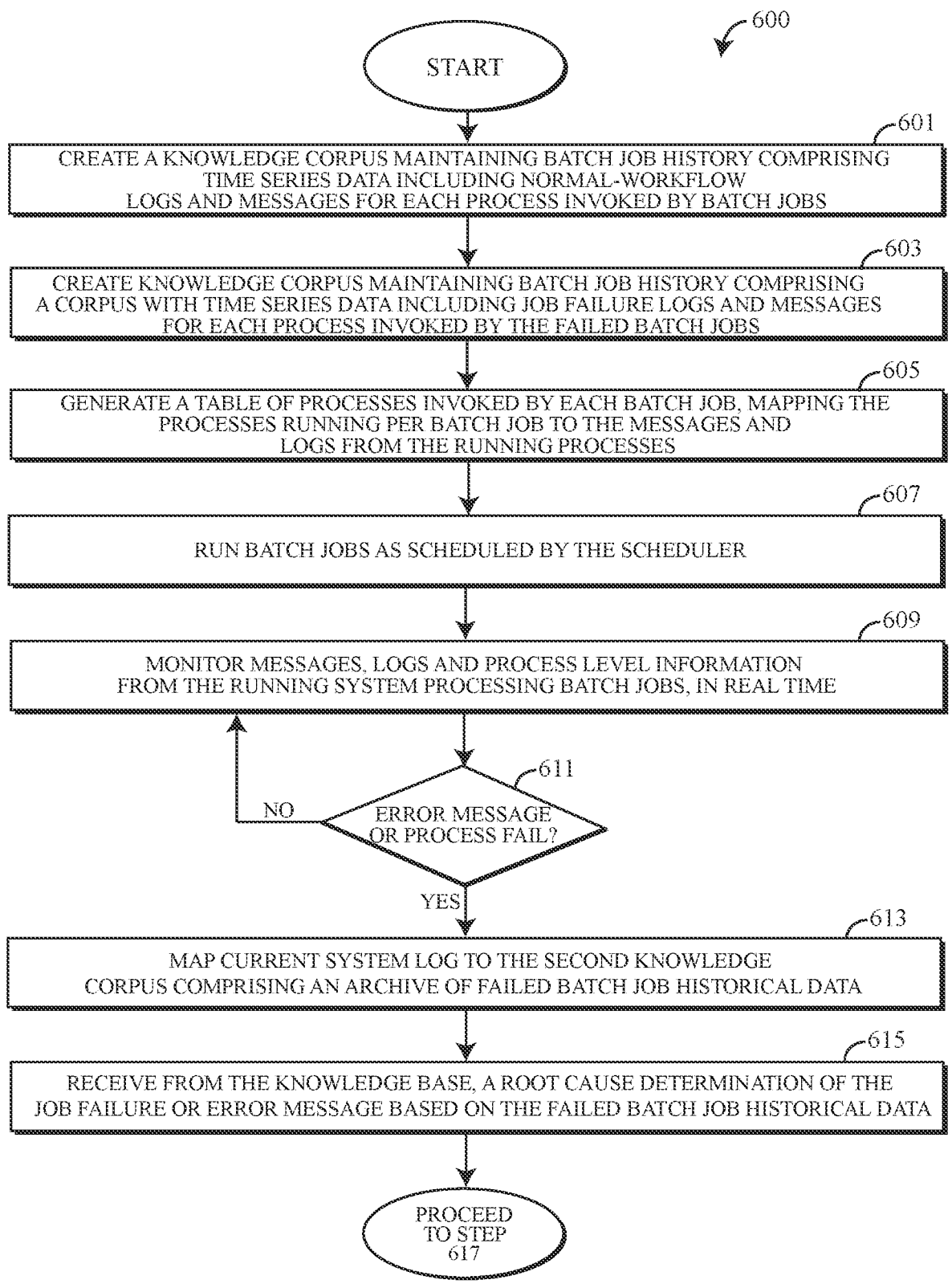
FIG. 6A depicts a flow diagram describing an embodiment of a method for predicting, preventing and/or remediating batch job failures in accordance with the present disclosure.
Figure 6B:
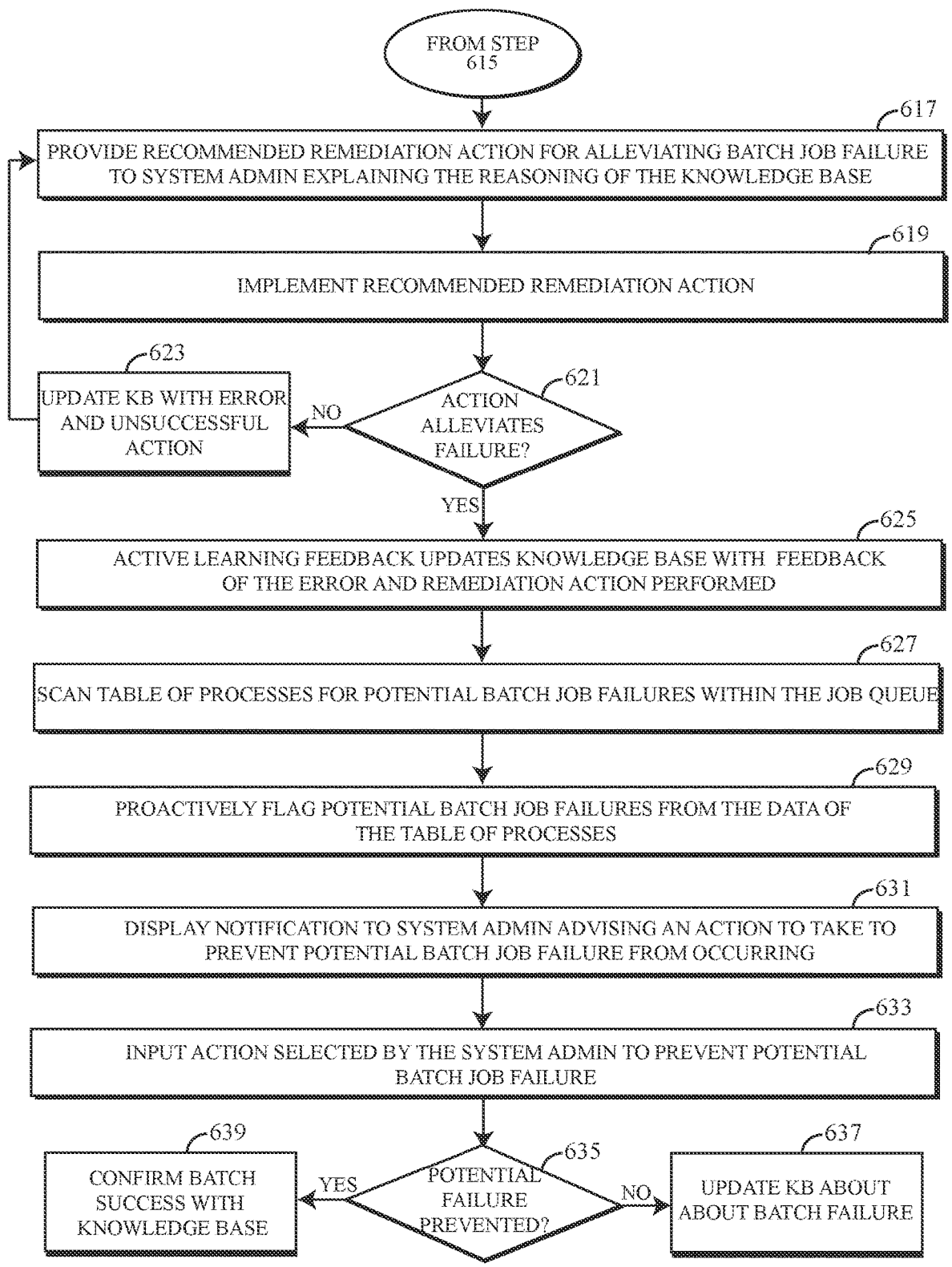
FIG. 6B depicts a flow diagram describing a continuation of the method of FIG. 6A for predicting, preventing and/or remediating batch job failures, in accordance with the present disclosure.

Referring now to FIG. 5, a set of functional abstraction layers provided by cloud computing environment 400 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include mainframes 561; RISC (Reduced Instruction Set Computer) architecture-based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment 400. Metering and pricing 582 provide cost tracking as resources are utilized within the cloud computing environment 400, and billing or invoicing for consumption of these resources. In one example, these resources can include application software licenses. Security provides identity verification for cloud consumers and tasks, as well as protection for data and other resources. User portal 583 provides access to the cloud computing environment 400 for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include software development and lifecycle management 591, data analytics processing 592, multi-cloud management 593, transaction processing 594; batch management module 213 and batch application(s) 210 workloads.

Figure 2:
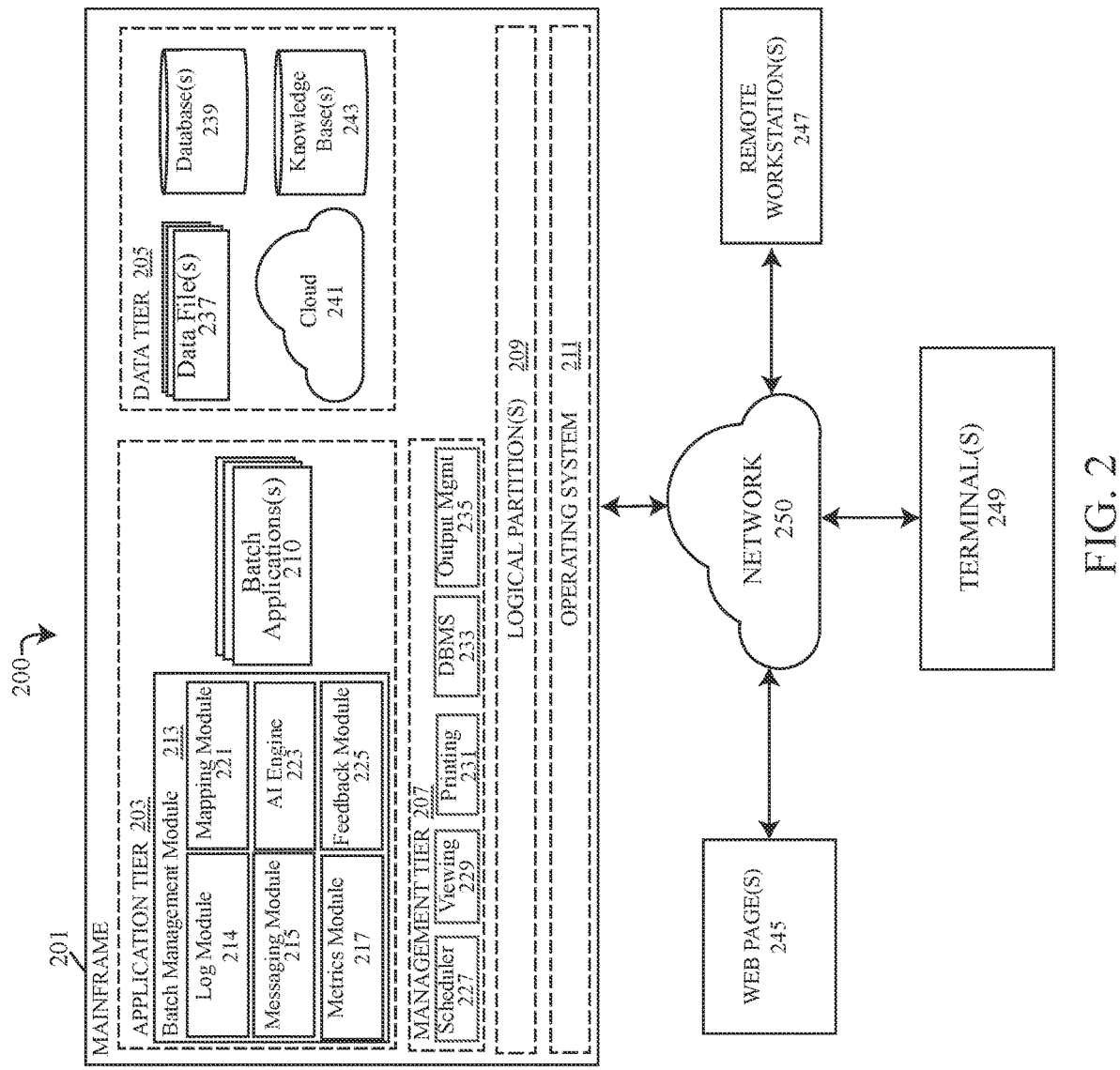
FIG. 2 depicts a functional block diagram describing an embodiment of a computing environment for predicting, preventing and/or remediating batch job failures in accordance with the present disclosure.

Referring to the drawings, FIG. 2, illustrates a computing environment 200 describing a mainframe 201 architecture capable of predicting, preventing and remediating batch job failures that may occur during the processing of one or more batch applications 210. Embodiments of the architecture of mainframe 201 includes a plurality of components, systems and/or services and sub-systems thereof. For example, as shown in the exemplary embodiment, the architecture may include logical partition(s) (LPAR) 209, operating system 211, a plurality of front-end systems 245, 247, 249, as well as an application tier 203, data tier 205, and management tier 207 of mainframe 201.

Embodiments of front-end systems 245, 247, 249 may be computing systems accessed by users to initiate transactions and/or transaction requests via remote workstation(s) 247, terminal(s) 249 (or terminal emulators), and/or web page(s) 245. Front-end systems 245, 247, 249 may provide customized user interfaces allowing users to input commands and/or provide communication with the applications hosted by mainframe 201, as well as display information and output from applications hosted by the mainframe 201. For example, front-end systems 245, 247, 249 provide inputs to or display outputs from the mainframe 201 via a web browser, an application programming interface (API) and/or a graphical user interface (GUI). Embodiments of LPAR 209 may be implemented within mainframe 201 to divide computing resources. The physical mainframe 201 may be divided into multiple LPARs 209. Operating system 211 may be the system software that manages the hardware of the mainframe 201, as well as software resources and common services utilized by one or more programs and applications hosted by mainframe 201. An example of a mainframe operating system 211 can be IBM's z/OS operating system.

Embodiments of the application tier 203 of mainframe 201 may perform tasks associated with processing information and inputs collected from the front-end systems 245, 247, 249, manage the business logic of the batch applications 210 hosted and processed by the mainframe 201. Moreover, the application tier 203 may include tools and functionalities that facilitate access to the data tier 205 during the performance and processing of the batch applications 210. Embodiments of the application tier 203 in a mainframe 201 may include transaction management tools and/or a message-based transaction manager tools. For example, IBM's Customer Information Control System (CICS) or IBM's Information Management System (IMS).

The data tier 205 may be responsible for storing and retrieving information from various databases and/or file systems. The data tier 205 passes information requested by the application tier 203 for processing batch jobs and may eventually pass the data to the end user viewing the data via a front-end system 245, 247, 249. As shown in FIG. 2, the data tier 205 may comprise one or more database(s), data files(s) 237, knowledge base(s) 243 and even network-accessible data stores such as cloud 241 storage. Data structures and flat-file data formats stored by the data tier 205 may be managed by a database management system (DBMS) 233, which can manage data structures that that contain one or more tables and/or data assigned to storage pools of physical data sets. DBMS 233 provides access to the data within the data tier 205 and in some instances, DBMS 233 may run within its own LPAR 209 of the operating system 211. In some embodiments of the data tier 205, a directory may be available for identifying locations of data within the storage pools, and logs may be stored containing a record of operations performed on the database(s) 239.

Management tier 207 may provide a plurality of tools for managing one or more functions of the mainframe 201. For example, managing access to the data tier 205 via DBMS 233, and scheduling batch jobs within batch application(s) 210. Moreover, management tier 207 may comprise a plurality of output management tools for batch application(s) 210 which can capture, view, manage and export batch outputs of the batch application(s) 210 via output management 235 to viewing tool 229 or printing tool 231. Viewing tool 229 can offer access controls and viewing of batch outputs by modern GUI's and user interfaces of front-end systems 245, 247, 249 as well as life cycle management, data masking and bulk storage/archival functions. Printing tool 231 can convert outputs from batch application(s) 210 into different formats, including PDF, email, or make outputs available online. Moreover, printing tool 231 can send the batch outputs to a printer or write the outputs to a database 239, cloud 241 storage and/or knowledge base 243.

Embodiments of mainframe 201 may be responsible for processing huge amounts of data records as a result of the numerous transactions requested by the front-end systems 245, 247, 249 using workloads made available by mainframe 201. In order to process the large volume of transaction being requested, mainframe 201 may organize the batch jobs from the batch workloads into one or more batch applications 210 for processing. A batch job may refer to a computer program or set of programs processed in batch mode. While processing in batch mode, a sequence of commands to be executed by the operating system 211 can be listed in a file, which may be referred to as a batch file, command file, job script or shell script. Batch applications 210 may refer to a type of application software which includes business logic that may be run on an operating system 211 at periodic intervals to produce meaningful output from the accumulated data.

Embodiments of batch applications 210 may be made up of a plurality of batch jobs. The execution order of the batch jobs, whether running in parallel or serial to one another, may be managed by scheduler 227, which may provide logical groupings of the batch jobs. Batch jobs that are currently being executed may be referred to herein as currently executed batch jobs, whereas the remaining batch jobs that are scheduled, but not yet being executed may be referred to as being in the batch job queue. Each batch job of the batch application 210 may contain one or more step, wherein each step executes a program or application. While the executed program or application is running in memory, the program or application may be referred to as an invoked process. In some instances, the programs or applications may call other programs during execution. The collection of programs and applications that are executed during the job steps are the business logic that may transform the input into the output of the batch application 210. Each job step includes input and output into the program of the particular step, and in some batch jobs, the output from a previous job step or the final output of a batch job may feed into the next job step or batch job of the batch application 210 as input. Output from completed batch applications 210 may be managed by output management 235, wherein output management 235 may invoke one or more management tools within the management tier 207. For example, viewing tool 229, printing tool 231 or DBMS 233, to export the output to a front-end system 245, 247, 249, and/or to one or more data structures of the data tier 205.

In some embodiments of the computing environment 200, 300, 400, the mainframe 201, or other host computing device such as a server or network node, may comprise a batch management module 213 capable of predicting, preventing, and remediating the occurrence of batch job failures that may occur during performance of processing one or more batch applications 210. The term "module" may refer to a hardware module, software module, or a module may be a combination of hardware and software resources. Embodiments of hardware-based modules may include self-contained components such as chipsets, specialized circuitry, one or more memory 105 devices and/or persistent storage 106. A software-based module may be part of a program 114, program code or linked to program code containing specifically programmed instructions loaded into a memory 105 device or persistent storage 106 device of one or more specialized computing systems 100 operating as part of the computing environment 200, 300, 400; for example, memory 105 of mainframe 201. In some embodiments, the batch management module 213 may include sub-modules or sub-components performing one or more specialized tasks, processes or functions of the batch management module 213. For instance, in the exemplary embodiment depicted in FIG. 2, the batch management module 213 comprises a log module 214, messaging module 215, metrics module 217, mapping module 221, AI engine 223 and feedback module 225.

Embodiments of batch management module 213 may create a plurality of knowledge corpuses within knowledge base 243. The first knowledge corpus may archive data chronicling the successful completion of batch jobs of one or more batch application(s) 210. The first knowledge corpus comprising archived data of successful batch jobs may comprise time series data tracking system logs, messages with relative time stamps, average time for completion, process level information describing processes invoked during the job steps, and system metrics for the mainframe during the execution of the batch jobs. A second corpus of knowledge base 243 may archive data chronicling failed batch jobs of the one or more batch application(s) 210. The second corpus of knowledge base 243 may include time series data of unsuccessful job logs of the failed batch jobs, along with corresponding error messages, and system metrics measured during the execution of the failed batch job.

Embodiments of the batch management module 213 may include one or more modules for gathering relevant metrics and data during the processing of batch jobs of one or more batch applications 210 and build the archived data of the knowledge base 243; including both the first corpus comprising the information associated with the successful batch jobs and the second corpus describing the parameters surrounding failed batch jobs. As depicted in FIG. 2, the data gathering modules that may build the records of the knowledge base 243 over time may include the log module 214, messaging module 215 and metrics module 217. Embodiments of the log module 214 may perform the task or function of creating and storing log files describing the computing environment of the mainframe 201 during the processing of the batch jobs. The log files created by the log module 214 may keep a registry of events, processes, messages and communications between various communicating software applications, and the operating system 211. Log files may be present in executable software, operating systems 211 and programs, whereby all messages and process details may be recorded. The log files may be copied to one or more data structures of the data tier 205. Embodiments of log files may automatically produce time-stamped documentation of processes of a system while in an execution and running state. Embodiments of the log files being recorded by the log module and stored as part of the knowledge base 243 can be analyzed later on, even after the program or application that created the log file has been closed. For example, the log files recorded and stored by the log module 214 may be analyzed by the knowledge base 243, and/or the AI engine 223.

Messaging module 215 may intercept and/or gather workflow messages and queued messages being shared between programs and applications executed within the computing environment 200, including programs that are executed as part of the batch applications 210 performing batch jobs and each step of the batch job. Messaging module 215 may help build the archived data of the first corpus and second corpus of the knowledge base 243 by contributing the workflow messages to the knowledge base records over time, as batch jobs are successfully or unsuccessfully completed. The messages may include successful, positive messages about the workflow and/or error messages when workflow is not completed successfully. Moreover, relative time stamps can be collected as well and associated with each of the messages, which can be provided to the knowledge base 243, allowing the knowledge base 243 to identify useful information including the average time to complete each batch job or job step, descriptions of errors described by the messages, and how long errors took to arise in a particular job step's cycle. Using a combination of log files and messages, the knowledge corpuses of the knowledge base can be organized to create time series data for each of the successful or unsuccessful; batch jobs.

In some embodiments of the batch management module 213, a metrics module 217 may be present. The metrics module 217 may gather data of the mainframe 201 during the processing or one or more batch applications 210 in order to assess the overall health of the mainframe 201. The mainframe 201, or other types of computing systems responsible for processing the batch jobs of the batch applications 210 may deploy a number of resources, such as CPU, I/O, storage and networks that work collectively to process a batch job. In order to assess the system's overall health, data for system reports can be gathered using certain key performance metrics for these resources. Examples of performance metrics that can be gathered and assessed may include average throughput, average response time, resource utilization (i.e., CPU utilization, processor storage utilization, I/O rates, paging rates, etc.) and resource velocity (i.e., ratio of time taken using a resource compared with the total time spent waiting in queue for the resource).

Performance metrics collected by the metrics module 217 can be added to the knowledge based and/or used in combination with log and messaging to predict process failures using a complex correlation between the logs, system management and service management. The combination of event data described by logs and messaging with the performance metrics of the system can be analyzed using multi variate analytics, wherein predictions of failures may be determined wherein more than one parameter of the system management goes beyond a known threshold at a particular point in time during processing of a batch job. The multi-variate analytics that incorporate the use of performance metrics can detect process failures are a present possibility when multiple system variables are going out of bounds at the same time. For example, where a log describes an anomaly alongside an anomalous CPU usage rate, storage I/O rate and/or memory usage outside, higher than normal for the processing of a particular batch job. The presence of multiple system metrics alongside the logs can be assessed by the knowledge base 243 and/or AI engine 223 to estimate a potential failure probability, flag the batch processing event and/or notify a system admin of the mainframe 201 of the potential probability of failure.

The archive of data collected by the log module 214, messaging module 215 and metrics module 217 can build the knowledge base 243 over time and allow the knowledge base 243 to analyze batch jobs of the batch application and use historical data archived within the knowledge base to predict the occurrence of batch failures, prevent batch failures before they can occur and recommend steps for alleviating existing batch job failures and errors received during batch job processing. Embodiments of the knowledge base 243 may be a human-readable and/or machine-readable resource for disseminating and optimizing information collection, organization and retrieval for a computing environment 200, 300, 400 and more specifically, for organizing and maintaining the archive of historical batch jobs processed as batch applications 210, including compilations of records comprising messages, logs and process level information associated with each batch job that either succeeded or failed as well as records of performance metrics and system health information. The knowledge base 243 may draw upon the knowledge of humans and artificial intelligence, that has been inputted into the knowledge base 243 in a machine-readable form. For example, inputs from log module 214, messaging module 215, metrics module 217 and feedback module 225 in the form of logs, messages, errors, performance metrics and user feedback. Embodiments of the knowledge base 243 may be structured as a database 239 in some instances. Embodiments of the knowledge base 243 may be used to find solutions to current and future problems by using the messages, errors, metrics, process-level information, feedback and other data inputted into the knowledge base 243 in order to automate the predictions, decisions, responses, and recommendations for existing or predicted batch job failures.

Embodiments of the knowledge base 243 may not be simply a static collection of information. Rather, the knowledge base 243 may be a dynamic resource having the cognitive capacity for self-learning, using one or more data modeling techniques and/or by working in conjunction with one or more machine learning programs and/or AI engine 223 to predict, prevent and remediate batch job failures in executing batch applications 210 and/or batch jobs placed in the batch job queue and or identifying the root cause of potential batch job failures. Embodiments of the knowledge base 243 may apply problem-solving logic and use one or more problem-solving methods to provide a justification for conclusions reached by the knowledge base 243 when predicting batch job failures, identifying root causes of batch failures and/or for recommending a particular remediation actions anticipated to prevent further batch job failures from occurring.

A knowledge corpus may refer collections and/or the fragments of knowledge inputted into the knowledge base 243, for example the collection of logs, messages, metrics, outcomes, feedback etc. Embodiments of the different knowledge corpuses can be independent and uncoordinated from one another, whereas the knowledge base 243 compiling all of the knowledge corpuses, may have an intentional ontological design for organizing, storing, retrieving and recalling the collection of knowledge provided by each knowledge corpus. For example, the knowledge base 243 may include two knowledge corpuses in the exemplary embodiments; a corpus comprising a history of successful batch jobs that includes the associated messaging, log information, performance metrics, process-level information indicating the successful batch job completion; and a second corpus comprising historically unsuccessful batch jobs and the associated logs, messaging, performance metrics and process level information. The historical archive of collected data from both successful and/or unsuccessful histories of batch jobs, along with user feedback can be applied to making future predictions about currently executing batch jobs and queued batch jobs scheduled to be executed by batch applications 210. Embodiments of the knowledge base 243 may perform automated deductive reasoning, machine learning or a combination of processes thereof to predict future batch job failures, provide root cause analysis of existing batch jobs failures and recommend the most probable resolution and remediation steps for alleviating the current or predicted batch job failures of batch applications 210.

Embodiments of a knowledge base 243 may comprise a plurality of components to operate and make decisions directed toward predicting future batch job failures, providing root cause analysis of existing batch jobs failures and recommending the most probable resolution and remediation steps for alleviating the current or predicted batch job failures of batch applications 210. Embodiments of the knowledge base 243 may include components (not shown) such as a facts database, rules engine, a reasoning engine, a justification mechanism, and a knowledge acquisition mechanism. The facts database may contain the knowledge base's 243 current fact pattern of a particular situation, which may comprise data describing a set of observations based on current logs, messages, metrics, process level information and/or user input or feedback for a current batch job being assessed.

Embodiments of the rules engine of knowledge base 243 may be a set of universally applicable rules that may be created based on the experience and knowledge of the practices of experts, developers, programmers and/or contributors to the knowledge corpuses of the knowledge base 243. The rules created by the rules engine may be generally articulated in the form of if-then statements or in a format that may be converted to an if-then statement. The rules of knowledge base 243 may be fixed in such a manner that the rules may be relevant to all or nearly all situations covered by the knowledge base 243. While not all rules may be applicable to every situation being analyzed by the knowledge base 243, where a rule is applicable, the rule may be universally applicable.

Embodiments of the reasoning engine of knowledge base 243 may provide a machine-based line of reasoning for solving problems, such as determining a root cause analysis of a batch job failure, predicting batch job failures of currently executing or queued batch jobs of a batch application 210 and predicting remediation actions to alleviate existing or predicted batch job failures. The reasoning engine may process the facts in the fact database and the rules of the knowledge base 243. In some embodiments of the knowledge base 243, the reasoning engine may also include an inference engine which may take existing information stored by the knowledge base 243 and the fact database, then use both sets of information to reach one or more conclusions and/or implement an action. Embodiments of the inference engine may derive new facts from the existing facts of the facts database using rules and principles of logic.

Embodiments of the justification mechanism of the knowledge base 243 may explain and/or justify how a conclusion by knowledge base 243 was reached. For example, displaying the justification for concluding a root cause of a batch failure, predicted batch failure or remediation step for alleviating a current or predicted batch failure to a system admin or operator. The justification mechanism may describe the facts and rules that were used to reach the conclusion. Embodiments of the justification mechanism may be the result of processing the facts of a current situation, including the logs, messages, performance metrics, feedback and AI engine 223 outputs, in accordance with the record entries of the knowledge base 243, the reasoning engine, the rules and the inferences drawn by the knowledge base 243. The knowledge acquisition mechanism of the knowledge base 243 may be performed by manual creation of the rules, a machine-based process for generating rules or a combination thereof.

In some embodiments, the knowledge base 243 may utilize the artificial intelligence of cognitive computing capabilities of an AI engine 223, which may apply one or more machine learning techniques or cognitive computing models, either in conjunction with or as part of the knowledge base 243, to arrive at one or more predicted batch job failures, root cause conclusions for a batch job failure, and/or recommended actions for remediating existing or predicted batch job failures. Machine learning may refer to a method of data analysis that may automate analytical model building, allowing for components of mainframe 201 to learn from the collected time series data, including metrics, logs, messages, feedback, process-level information etc. inputted and analyzed by the AI engine 223, including past instances of archived historical data processing of one or more successful or failed batch jobs, in order to justify patterns and make decisions and predictions about future batch job outcomes. Embodiments of the AI engine 223 of knowledge base 243 may utilize supervised, unsupervised or semi-supervised techniques to automate batch failure predictions.

Embodiments of the batch management module 213 may include a mapping module 221. The mapping module 221 may create and update a table of processes invoked by each of the batch jobs executed by the batch applications 210. As noted above, batch jobs may be executed in job steps, which may execute one or more programs comprising a set of instructions. As the one or more programs are executed in the memory of the mainframe 201 or other computing system running the batch applications 210, as processes. Embodiments of the table of processes may include a mapping of processes being invoked by each batch job to the messages and logs associated with each process being invoked by the batch job.

Use of the archive of historical batch job successes or failures learned by the knowledge base 243, along with the mappings of processes to batch jobs can provide a powerful tool for identifying the underlying causes of batch job failures, including for example the presence of faulty or failed processes invoked by the batch jobs, which can be identified from the mapping of the combination of batch job, log and messages mapped to the table of processes. Embodiments of the batch management module may use a combination of the table of processes and knowledge base 243 data to perform a root cause analysis (RCA) of failed batch jobs and provide suggested remediation actions for alleviating the root cause of any particular batch job failure. For example, as mainframe 201 is running a batch job on any given day, if there is a batch job failure, potential remediation of the failure may be provided almost immediately by mapping the current system log to the knowledge corpus of knowledge base 243 comprising "unsuccessful batch job logs". Using the archived data of the knowledge base 243, and the table of invoked processes for the batch job that failed, similar failed batch jobs can be found that invoked the same process or were operating under the same parameters as the failed batch job being analyzed. Using the knowledge base 243, the previous root cause for the similar batch job failure can be used to identify a current batch job failure, and any remediation actions that previously corrected the historical batch job failure may be recommended and presented to the operator or administrator of the mainframe processing the failed batch job being analyzed.

Embodiments of the batch management module 213 may use a combination of the knowledge base 243 and table of processes to further predict future batch job failures for batch jobs currently in queue waiting to be processed by the batch applications 210. For example, upon receiving an error message that an executed batch job has failed, knowledge base 243 may cross reference the failed batch job with the invoked processes mapped by the mapping module 221 and identify the conditions or invoked processes of the batch job that were being at the point in time the batch job failed. Subsequently, using the information from the mapping module 221, knowledge base 243 may draw additional conclusions about the invoked processes that caused the batch job failure, and extrapolate the causes of the batch job failure to the invoked processes and further predict whether additional batch jobs of the batch applications 210 which may be queued to invoke the same process may also fail due the same invoked process and alert the system administrator or mainframe operator of the impending issues surrounding a potentially faulty process that may be responsible for the batch job failures. The batch management module 213 may find that certain invoked processes failing at the time of the batch failure may mean that it may not be prudent to executing or continuing to execute batch jobs expected to invoke the failed processes knowing that the batch jobs being executed or in queue will likely fail when the batch job invokes the process that cause other batch jobs to fail, causing a waste of MIPs.

Embodiments of the batch management module 213 may flag the batch jobs that are in queue for execution by the batch applications 210 and anticipated to be potential batch failures; for example, due to a faulty process expected to be invoked. The batch management module 213 may anticipate that the queued batch jobs will continue to fail if they invoke the process causing failures as mapped by the mapping module 221 and recognized by the knowledge base 243, unless a fix is implemented before executing the process again as part of a queued batch job. Embodiments of the batch management module may provide a report or notification via one or more tools of the management tier 207 to a system admin or operator so that an appropriate action may be applied to fix the invoked process identified. Examples of an appropriate action that may be recommended and/or applied may include terminating an entire batch job or batch application 210, restart a failing batch job or batch application 210, hold the execution of the queued batch jobs expected to invoke the process, fix the underlying issue of the failing process and then let the remainder of the batch application 210 run the queued batch jobs once a fix has been applied to the underlying process.

In addition to the use of the table of processes in conjunctions logs, metrics and messages to predict potential batch job failures, embodiments of the batch management module 213 may employ a more complex system analysis of process invocation using AI based process invocation modeling for code paths to predict potential batch job failures. AI based process invocation modeling can be performed separately from the log/metrics analysis described above, or embodiments of the batch management module 213 may employ the AI based process invocation modeling in addition to the log/metric-based analysis. AI engine 223 may perform the tasks or functions implementing dynamic process invocation for batch jobs using continuous, active learning to tune a dynamic model for predict dynamic code paths being invoked by each batch job and this the various processes invoked by each job of the batch application, even as the invoked process may vary over time. Embodiments of the AI engine 223 may create time series data for known tasks and steps of the batch job and capture the various code paths invoked by the tasks and steps of the batch job. A recurrent neural network/long-term short memory model can be trained by the AI engine to predict for any batch job of the batch application 210, which processes the queued-up steps or tasks of the queued batch jobs will be invoked based on the dynamic code path, and therefore based on the parameters of the batch job and the invoked code path (and thus the processes), predict which steps or jobs of the batch jobs will fail, using available historical data of the knowledge base 243.

Embodiments of the AI engine 223 may further optimize the use of computing resources to compute the dynamic process invocation pattern, so save on costs associated with performing the AI analysis of the batch jobs and the code paths. In the exemplary embodiment, workloads of the batch applications 210 may be analyzed by the AI engine 223 and classified into different categories, that may or may not be subject to analysis of the invocation pattern of the code paths. For example, workloads that exhibit linear invocations of processes for each step or job of the batch job, based on historical time series data, may not require a code path prediction of the invocation pattern; whereas workloads exhibiting varying patterns of invoking processes based on program or application parameters may have dynamic code paths predicted.

Embodiments of the feedback module 225 may allow continuous improvement of machine learning algorithms and the AI engine 223 by receiving continuous feedback from system admins and operators, then feeding back the input from the admins and operators to the appropriate model or algorithm. For instance, feedback may be requested by the batch management module 213 wherein a root cause analysis of a batch failure is identified, predicted batch failures are presented and/or recommendations for remediating existing batch failures are presented or predicted by the batch management module and presented to a user via a front-end system 245, 247, 249. Users of the mainframe, such as system admins or operators may indicate to the feedback module 225 whether or not presented predictions, RCA's and/or recommendations were accurate or fixed underlying batch job failures. Where feedback to the feedback module 225 are indicated to be positive, the feedback module 225 may record the positive feedback to the appropriate records of the knowledge base 243 or the AI engine 223, causing the knowledge base 243 and/or AI engine to reinforce the accuracy of the models or machine learning algorithms as correct and accurate. Likewise, where incorrect or improper predictions, analysis or recommendations are presented by the batch management module 213 to a user of a front-end system 245, 247, 249, the feedback received from the feedback module 225 may cause the knowledge base 243 and/or AI engine to adjust the models or machine learning algorithms to improve future output being presented.

Embodiments of batch management module 213 may predict failures of queued batch jobs using process level anomaly detection using a combination of the system messages/logs alongside the table of processes. Anomaly detection by the batch management module 213 may be performed in real time or near real time monitoring of error messages and logs gathered by the log module 214 and messaging module 215 coming from a current batch job being executed by the batch application 210. Mapping module 221 can map the current batch job back to certain processes being invoked and proactively predict of the batch job is going wrong based on any anomalies found in the real time message activity being collected and compared with the historical data of the knowledge base 243, on a per-process basis. For example, during the execution of a batch job, real-time analysis of the messages and logs from the batch job are performed, comparing the logs and messages being analyzed to archived data sets of the knowledge base, wherein batch jobs running successfully should be following an expected invocation of processes and receiving messages consistent with the first corpus of the knowledge base, indicating a successful batch job is likely. Anomalies can be dynamically detected within the process log to proactively predict potential batch job failures as if the batch job behaves in an unexpected manner from the known, successful historical data, invokes unexpected processes or causes the metrics of the system to behave in a manner consistent with poor performance or unexpectedly. If discrepancies between the current batch job logs and the historical data for successful batch jobs is detected, then the batch job being executed can be flagged as an anomaly at the process level and a prediction can be made if a potential failure of the batch job is predicted eventually. Moreover, similar jobs in queue, expected to invoke the same processes as the flagged batch job but have not yet been executed, can also be flagged as predicted batch job failures.

Embodiments of the batch management module 213 implementing anomaly detection may implement dynamic thresholding for detecting anomalies at the process level, rather than using static thresholds for each batch job being executed. The use of dynamic thresholding to set dynamic thresholds for the machine learning algorithm can reduce false positive identification of anomalies. Dynamic thresholds can represent bounds of an expected data range for particular datapoints being measured during anomaly detection. Unlike static data point thresholds that are manually assigned, dynamic thresholds can be calculated by the anomaly detection algorithm and continuously trained using the historical data values collected by the batch management module 213 and may continuously be improved over time from active and continuous feedback provided by the system admin or operator via the feedback module 225.

In some embodiments, AI based process level anomaly detection can be implemented to predict batch job failures of queued batch jobs awaiting execution by the batch application(s) 210. This second level of anomaly detection analysis using AI can be performed on the process level failures themselves to determine if the cause of a batch job failure is something a system admin or operator can influence up front to prevent the batch job failure. For example, a batch job that requires printing a report, but a batch job is stuck on the printing process because the printer is out of paper. Using AI prediction analysis of the jobs or job steps, the AI can understand which processes are likely to be involved by certain jobs and in the job sequence of a batch application, and now in addition to knowing which processes will get invoked, the AI engine 223 will learn know which processes are likely to fail in near future, based on past history and of these process failures, understand how many such process failures can be prevented by operator intervention. Embodiments of the AI engine 223 can output alerts and notifications that alert a system admin of preventable batch failures, informing the admin or operator of the available front intervention that may be needed to prevent such process failure (e.g., Printer going out of paper and the job is hence stuck of timed out) before the batch job fails.

Figure 3:
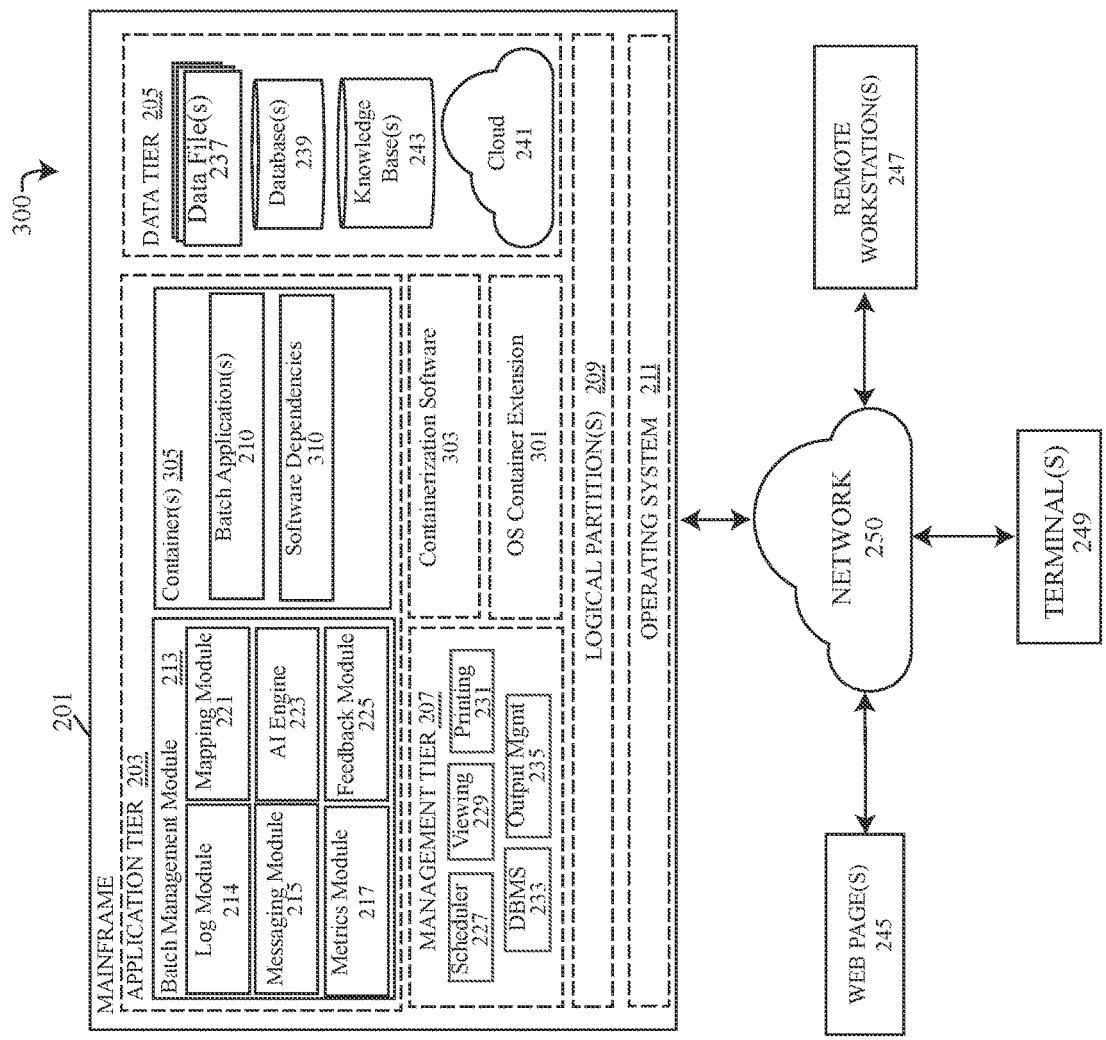
FIG. 3 depicts a functional block diagram describing an alternative embodiment of a computing environment for predicting, preventing and/or remediating batch job failures in accordance with the present disclosure.

Referring back to the drawings, FIG. 3 describes an alternative embodiment of a computing environment 300 capable of predicting, preventing and remediating batch job failures, in a manner consistent with the computing environment 200 described above. Different from the computing environment 200 of FIG. 2, as shown in FIG. 3, mainframe 201 is configured to run batch applications 210 within containerized environments. Mainframe 201 may containerize batch application 210 and/or the batch management module 213 (not shown in containerized form) along with any software dependencies 310, within the container's 305 operating environment. The mainframe 201 may run a multi-user operating system (i.e., the operating system 211) along with any extensions that may be necessary to support container 305, such as an OS container extension 301 which may provision computing resources of the mainframe's hardware to one or more container 305 being supported.

A containerization software 303, supported by the operating system 211 and/or the OS container extension 301, such as, but not limited to, the open-source Docker and/or OpenShift software, may execute and run the containerized batch applications 210 encapsulated within the environment of the containers 305, as shown in FIG. 3. Although the exemplary embodiment depicted in FIG. 3 includes only a single container 305, the embodiment of FIG. 3 is merely illustrative of the concept that a container 305 can be hosted by mainframe 201. The embodiment of FIG. 3 should in no way be considered to imply that the mainframe 201 is limited to hosting only a single container 305. The number of containers hosted by mainframe 201 may vary depending on the amount of computing resources available, based on the hardware resources and the amount of computing resources required by batch applications 210 and/or batch management module 213, being executed within the containers 305 by the containerization software 303.

Embodiments of the containerization software 303 may operate as a software platform for developing, delivering, and running containerized programs and applications, as well as allowing for the deployment of code quickly within the computing environment of the container 305. Embodiments of container 305 can be transferred between mainframes 201 and host computers, as well as between different data centers that may be operating in different geolocations, allowing for the container 305 to run on any mainframe 201 or computing system running containerization software 303 and the OS container extension 301 (as needed, based on configuration). The containerization software 303 enables the mainframe to separate the containerized applications and programs, such as the batch applications 210 or the batch management module 213 from the mainframe 201 and other infrastructure The containerization software 303 provides mainframe 201 with the ability to package and batch applications 210 or batch management module 213 within the isolated environment of the container 305. Isolation and security provided by individual containers 305 may allow the mainframe to run multiple instances of batch applications 210 and/or batch management module 213 simultaneously on a mainframe 201. A container 305 may be lightweight due to the elimination of any need for a hypervisor, typically used by virtual machines. Rather, the containers 305 can run directly within the kernel of the host operating system 211. However, embodiments of batch management module 213 or batch applications 210 may benefit from combining virtualization of virtual machines with containerization. For example, the mainframe 201 may be a virtual machine running containerization software 303 or emulating a mainframe.

Embodiments of the containerization software 303 may comprise a containerization engine (not shown). The containerization engine may be a client-server application which may comprise a server program running a daemon process, a REST API specifying one or more interfaces that the batch applications 210 or batch management module 213 and/or other programs may use to talk to the daemon process and provide instructions to the batch applications 210 or batch management module 213, as well as a command-line interface (CLI) client for inputting instructions. In one embodiment, the front-end systems 245, 247, 249 may input commands using a CLI to communicate with the containerization software 303 of the mainframe 201.

Embodiments of the CLI may use the REST API of the containerization engine to control or interact with the daemon through automated scripting or via direct CLI commands. In response to the instructions received from the CLI, via the REST API, the daemon may create and manage the objects of the containerization software 303, including one or more software images residing within the containers 305, the containers 305 themselves, networks, data volumes, plugins, etc. An image may be a read-only template with instructions for creating a container 305 and may be customizable. Containers 305 may be a runnable instance of the software image. Containers 305 can be created, started, stopped, moved or deleted using a containerization software 303 API or via the CLI. Containers 305 can be connected to one or more networks 250, can be attached to a storage device and/or create a new image based on the current state of a container 305.

Embodiments of the mainframe 201, illustrated in the block diagram of FIG. 3, depict a container 305, wherein a container 305 may comprise an image of batch applications 210 or batch management module 213 and software dependencies 310 for running instances of the batch applications 210 or batch management module 213 within the environment of the container 305. Software dependencies 310 may include application code, system tools, settings, runtime environment and system libraries. The images of the batch applications 210 or batch management module 213 depicted within the containers 305 may be duplicate versions of the batch applications 210 or batch management module 213 image. In some embodiments, the images of the batch applications 210 or batch management module 213 may be customized variations, based on a common image used as the basis for the customized variations of the batch applications 210 or batch management module 213, while in some embodiments, one or more of the batch applications 210 or batch management module 213 may be independently created and developed using entirely different images.

Method for Predicting, Preventing and Remediating Batch Job Failures

The drawings of FIGS. 6A-8 represent one or more embodiments of methods for predicting, preventing and remediating batch job failures, as described in accordance with FIGS. 2-5 above, using one or more computing systems defined generically by computing system 100 of FIG. 1; and more specifically by the embodiments of specialized computer systems depicted in FIGS. 2-5 and as described herein. A person skilled in the art should recognize that the steps of the method described in FIGS. 6A-8, may be performed in a different order than presented and may not require all the steps described herein to be performed. Rather, some embodiments may alter the methods by using one or more of the steps discussed below, including combining one or more method steps between FIG. 6A-6B, FIG. 7 and FIG. 8.

The embodiment of the method 600 may begin at step 601. During step 601, a knowledge corpus is created within a knowledge base 243. The knowledge corpus may comprise batch job histories of successful batch jobs, previously processed and completed. The batch job histories of the knowledge corpus may include records comprising time series data containing normal-workflow logs collected by log module 214, and messages collected by messaging module 215, for each process invoked by the batch jobs executed as part of batch application(s) 210. In some embodiments, additional performance metrics of the computing system processing the batch jobs, can be collected by metrics module 217 and stored as part of the knowledge corpus describing the histories of successful batch job.

In step 603 of method 600, a second knowledge corpus may be created and maintained by knowledge base 243. The second knowledge corpus may comprise historical data records describing unsuccessful batch job that were previously processed and failed. The failed batch job histories of the second knowledge corpus may include records comprising time series data containing work-flow logs of the failed batch jobs collected by log module 214, messages (including timestamped error messages) for each process invoked by the batch job that was processed and failed. Similar to the first knowledge corpus, the second knowledge corpus may also collect performance metrics collected by metrics module 217 describing system health and performance conditions at the time the historical batch jobs failed.

In step 605 of method 600, batch management module 213 may generate a table of processes invoked by each batch job of the batch applications 210 being executed. Mapping module 221 of the batch management module 213 may map each of the processes invoked by the batch jobs being executed to messages collected by the messaging module 215 and/or the logs of the running processes collected by log module 214. In step 607, the batch jobs are run by the batch applications 210, as scheduled by schedule 227. In step 609, the batch management module 213 may monitor the collected messages, logs, process-level information and performance metrics in real time, updating the table of processes as new processes are invoked by the batch jobs during run-time.

In step 611, a determination is made whether an error message has been received or a process being invoked by the batch jobs have failed. If an error message or failure has not occurred, the method 600 may return to step 609 and continue monitoring the messages, logs, process-level information and performance metrics until either the batch applications 210 complete the batch job(s) and/or one or more batch jobs receive an error message or fail. Conversely, if during step 611, an error message has been received by messaging module 215 indicating a process failure has occurred causing a batch job to fail, method 600 may proceed to step 613. During step 613, the current system log comprising the details of the failed batch job is mapped to the second knowledge corpus comprising the historical archive of data for previously failed batch jobs. In instances where the failed batch job is successfully mapped to a similar historical batch job failure, knowledge base 243 may apply one or more machine learning algorithms and analytics to perform a root cause analysis of the batch job failures based on the previous historical batch job failures, in order to identify an underlying root cause for the batch job failure and previously successful remediation steps of the historical batch job failures that may alleviate the failure of the present batch job failure being analyzed.

In step 615 of method 600, the knowledge base 243 may output results of the root cause analysis of the currently failed batch job. The outputted results may comprise a determination of the underlying cause of the job failure and/or error message, based on the historical data of the second knowledge corpus, an explanation and/or reasoning for the determination of the underlying cause and further analysis explaining steps that may have been previously successful for remediating the historical batch job failures found to be similar to the current batch job failures. In step 617, the output of the RCA results may display a recommendation for one or more remediation actions that may be implemented either automatically and/or by a system admin or operator that may alleviate the batch job failure if the batch job was re-executed. The knowledge base's 243 recommendation may explain the reasoning of the knowledge base for the underlying recommendation and a predicted level of success the proposed recommendation may have for remediating the batch job failure into a successfully completed batch job.

In step 619 of method 600, the recommended remediation action provided by the knowledge base 243 is implemented either automatically by the system, approved by the system admin or manually applied by the system admin. The failed batch job may be re-scheduled by schedule 227 and/or re-executed by the batch application 210 following the implemented remediation action performed during step 619. In step 621, a determination is made whether or not the recommended remediation action recommended by the knowledge base 243 successfully alleviating the batch job failure and allowed the batch job to be successfully completed. If the batch job failure is not alleviated, the method 600 may proceed to step 623, wherein the knowledge base 243 is updated with the additional error information and the results of the batch job failure following the implementation of the unsuccessful remediation action. The knowledge base 243 updates the machine-learning algorithm with the updated feedback as the method returns to step 617 and allows a new recommendation for a new remediation action to be presented, based on the updated data and revised machine-learning algorithm of the knowledge base 243.

Conversely, if in step 621, the recommended remediation action being implemented alleviates the batch job failure and allows the previously failed batch job to successfully be completed, in step 625 the active learning mechanism of the batch management module 213 may update the knowledge base 243 with feedback indicating that the implemented remediation has fixed the batch job failure, allowing the knowledge base 243 to reinforce the accuracy of the root cause analysis and recommended action as correct, and update the knowledge base records, improving future analysis about similar batch job failures that might be encountered and solved in a similar manner.

In step 627 of method 600, potential batch job failures within a batch job queue of batch applications 210 may be identified and/or remediated before executing the potentially failed batch job in the queue. Batch management module 213 may scan the table of processes for potential batch job failures within the job queue, by searching for queued batch jobs mapped within the tables to the same processes invoked by the previously executed batch job remediated in step 619 via the recommended remediation action. In step 629, any queued batch jobs mapped to invoked processes expected to cause batch job failure may be proactively flagged as a potential batch job failure, and in step 631, viewing tool 229 may display a notification to one or more front-end systems 245, 247, 249 indicating to a system admin or operator an advised action to take in order to prevent the potential batch job failure from occurring. For example, the recommendation may be to implement the same or similar action recommended in step 619 for alleviating the previously failed batch job or may include recommendations to fix a faulty process or prevent a faulty process from impacting the queued batch job.

In step 633, an action selected by the system admin or system operator may be inputted into the system in an effort to prevent the potential batch job failures of the queued batch jobs identified in step 631. In step 635, a determination may be made whether the failure of the potential batch job is prevented while executing the batch job at the scheduled time, by applying the inputted action of step 633. If the potential failure was prevented, the method 600 proceeds to step 639 and confirms the batch job's success with the knowledge base 243. Likewise, where the potential failure is not prevented and the batch job fails during execution, the method 600 proceeds to step 637, and updates the knowledge base 243 records with information and collected data, messages and logs describing the batch job failure.

Figure 7:
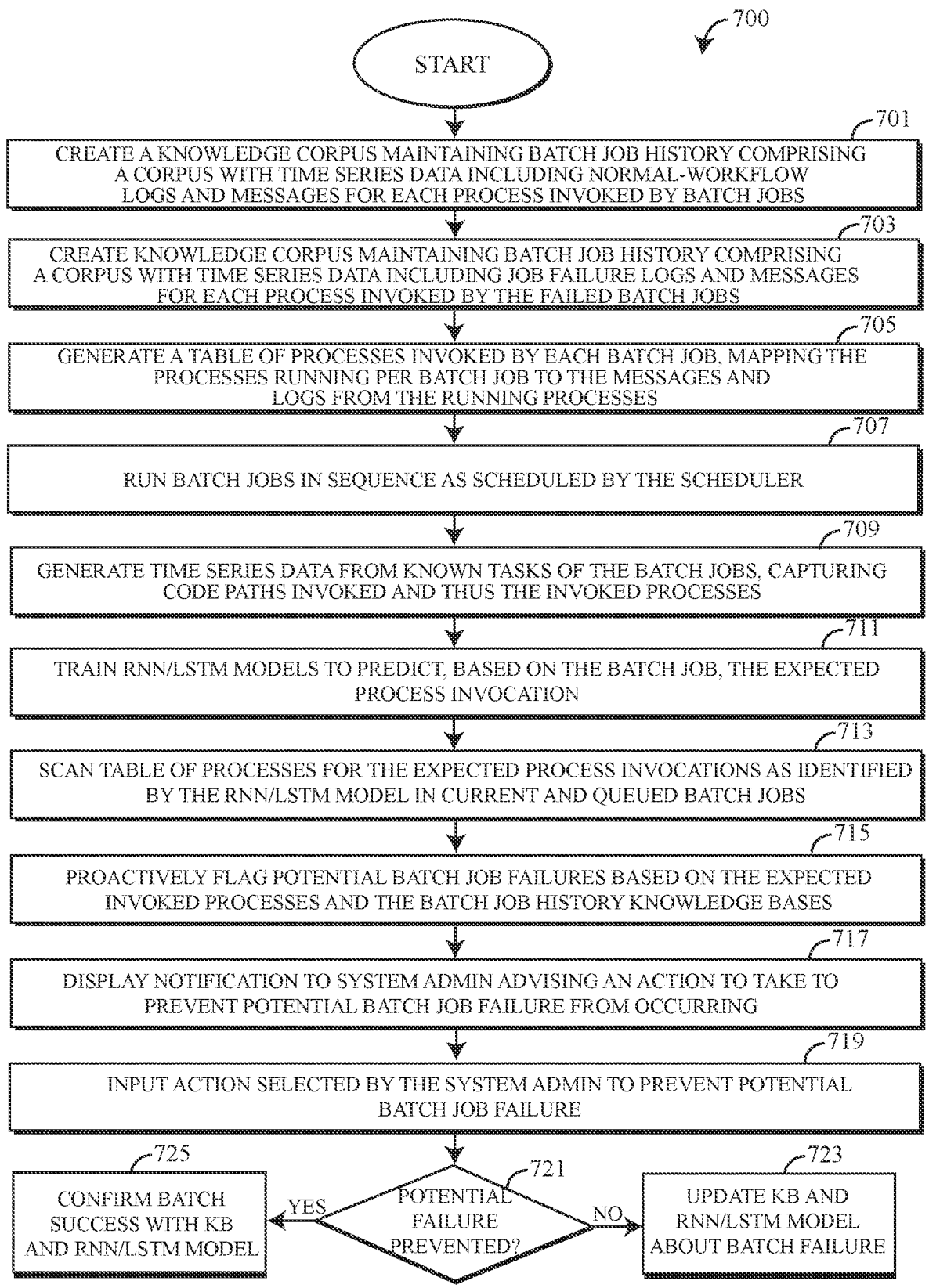
FIG. 7 depicts a flow diagram describing an embodiment of a method for predicting, preventing and/or remediating batch job failures using one or more AI models, in accordance with the present disclosure.

Referring to the drawings, FIG. 7 depicts a method of predicting potential batch job failures using AI learning techniques, such as RNN/LSTM models to predict code paths invoked by batch jobs, and from the dynamic code paths, identifying invoked processes that may cause the batch jobs to fail. Embodiments of method 700 may begin at step 701 to step 707 which are analogous to steps 601 to 607 of method 600, wherein the first knowledge corpus, the second knowledge corpus and table of processes are created, and the batch jobs are executed in sequences as scheduled by schedule 227.

In step 709 of method 700, times series data for known tasks of the batch jobs being executed are generated and AI engine 223 captures the dynamic code paths invoked by tasks or job steps of the batch job being executed. In some embodiments, the AI engine 223 may capture dynamic code paths for all batch jobs being executed. However, in other embodiments, the AI engine 223 may optimize the dynamic code patch process for learning process invocation by classify the workloads of the batch jobs into different categories that exhibit different behavior over time. For example, where a workload of a batch job exhibits linear invocation of processes for each task based on the historical time series data, no prediction of the code paths may need to be performed by the AI engine 223; whereas workloads of the batch jobs exhibiting varying invocations of processes based on application parameters may received predictions of dynamic invocation patterns.

In step 711, an RNN/LSTM model is trained by inputting the time series data from the known tasks of the batch jobs into the RNN/LSTM model. The RNN/LSTM model predicts, based on the batch job's time series data, an expected process invocation from the captured code paths invoked in step 709. Once the expected processes being invoked is known by the AI engine 223 via the RNN/LSTM model, in step 713, the table of processes can be scanned for the expected process invocations as identified for the current batch jobs and batch jobs queued for processing by the batch applications 210. In step 715, potential batch job failures are proactively flagged based on the expected invoked processes determined by the AI engine 223 and the batch job histories for failed batch jobs known to invoke same processes by the knowledge base 243, which resulted in batch job failures.

In step 717 of the method 700 a notification is outputted by viewing tool 229 or printing tool 231 for display. For example, by displaying the notification on a front-end system 245, 247, 249 to a system admin or system operator. Embodiments of the notification being presented and displayed may advise a recommended action to take to prevent the potential batch job failures proactively flagged in step 715 from occurring. In step 719, an action selected by the system admin or operator in response to the notification may be inputted to prevent the potential batch failures. In step 721, a determination is made whether the inputted action to prevent the potential job failure was successful or not. Where the inputted action was successful, the method proceeds to step 725 and confirms the success of preventing the potential job failure with the knowledge base 243 and the RNN/LSTM model of the AI engine 223. Alternatively, where the inputted action is not successful the method may proceed to step 723, wherein the knowledge base 243 is updated along with the RNN/LSTM model with the feedback information about the batch failure, including process level information.

Figure 8:
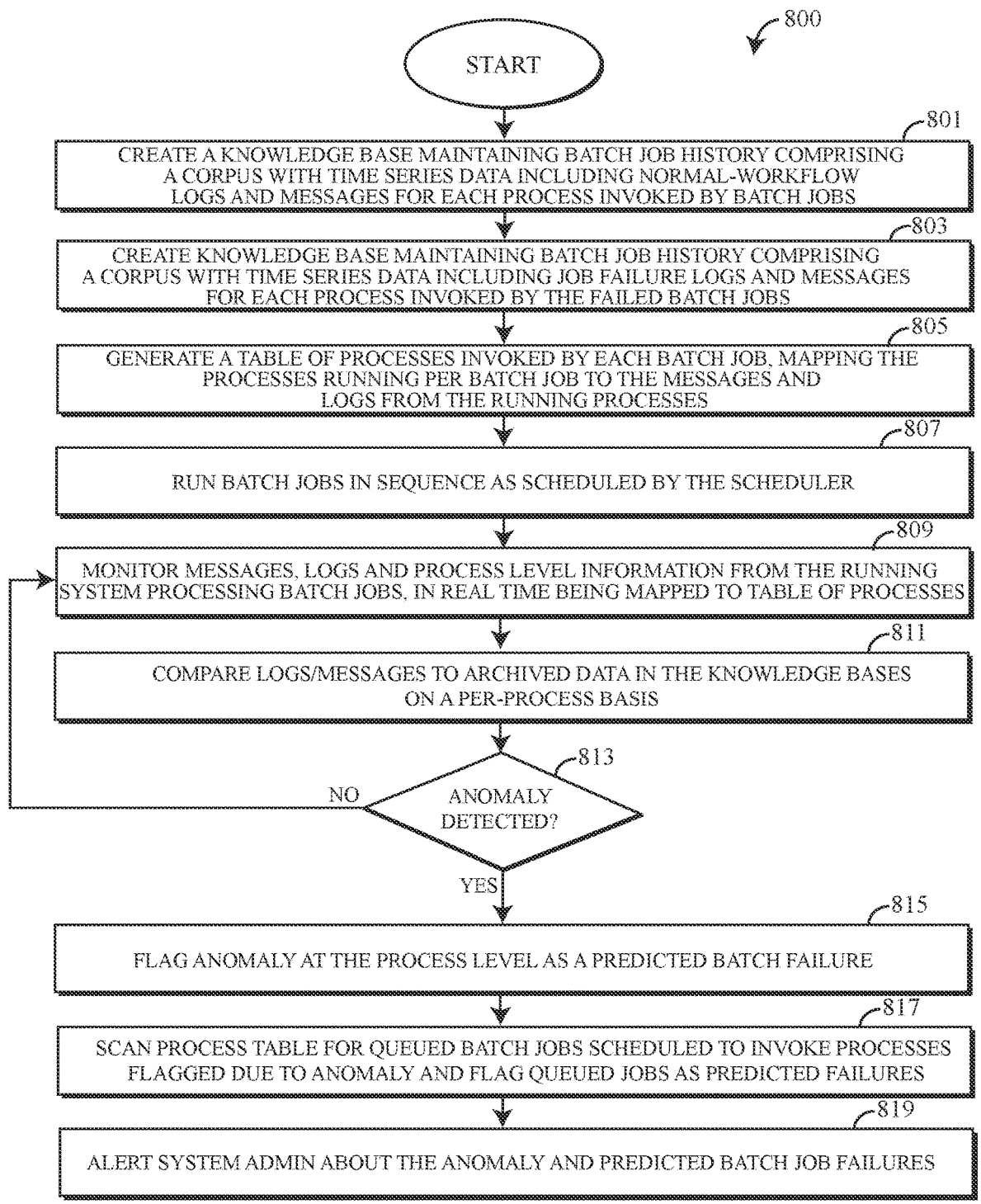
FIG. 8 depicts a flow diagram describing an embodiment of a method for predicting, preventing and/or remediating batch job failures using anomaly detection techniques to predict potential batch failures at the process level, in accordance with the present disclosure.

FIG. 8 describes an embodiment of a method 800 for implementing anomaly detection for the purpose of predicting and/or preventing batch job failures. Embodiments of method 800 may be implemented as a stand-alone method for predicting potential batch job failures or may be integrated into method 600 or method 700 described in detail above and compliment these additional techniques of batch job failure prediction, prevention and remediation. Embodiments of method 800 may begin at step 801 to 803 which are analogous to steps 601-607 and/or 701-707 of methods 600 or method 700, respectively.

In step 809, messages, logs and process-level information from running system processes of the batch jobs are monitored in real time and mapped to the table of processes. In step 811, during the monitoring of the processes being run in real time, logs and messages gathered by log module 214 and messaging module 215 are compared to the archived data of knowledge base 243 on a per-process basis, to track whether or not the processes being executed as part of the batch job are not deviating from the historically successful pattern of batch jobs completion described by the first knowledge corpus. Where the messaging and logs deviate from the successful pattern of batch jobs on a per-process basis, the deviation thereof may be considered an anomaly which may indicate a potential batch failure if the deviation is beyond a dynamically set threshold.

In step 813, a determination is made whether or not the processes invoked by the batch jobs being executed are anomalous. If an anomaly is not detected (i.e., the execution of the batch jobs is seemingly processing in accordance with the historical data of successful batch jobs) the method 800 may proceed back to steps 809 and 811 as continuous monitor and comparison of the messages, logs and process-level information continues in real time. Alternative, when an anomaly above the dynamically set threshold is detected, the method 800 proceeds to step 815, whereby the anomaly is flagged at the process level as a predicted batch job failure. In step 817, the process table is scanned for queued batch jobs that are also scheduled to invoke the flagged process that was identified as an anomaly and thus a potential batch job failure. The queued batch jobs mapped to invoke the flagged processes may also be flagged as predicted batch job failures. In step 819, an alert, notification or report describing the potential batch job failures is sent to the system admin or system operator and may include one or more recommended remedial actions for alleviating the predicted batch job failures.

What is claimed is:

1. A computer-implemented method for alleviating a batch job failure comprising:
creating, by a processor, a knowledge base including an archive of failed batch job histories comprising time series data of workflow logs, messages and invoked processes associated with failed batch jobs;
generating, by the processor, a table of processes mapping processes invoked by batch jobs to the workflow logs and the messages associated with the batch jobs;
monitoring, by the processor, the messages, the workflow logs and process-level information of the batch jobs being executed;
matching, by the processor, error messages or process failures of a current system log to error messages and the invoked processes of the batch job histories contained in the knowledge base;
displaying, by the processor, a root cause analysis of the error messages or process failures of a current system log and a recommended remediation action for alleviating the batch job failure; and
updating, by the processor, the knowledge base with feedback comprising results of applying the recommended remediation action.

2. The computer-implemented method of claim 1, further comprising:
scanning, by the processor, the table of processes for a potential batch job failure within a batch job queue, wherein the potential job failure is recognized as a queued batch job scheduled to invoke a same failed process as the process failures of the current system log;
proactively flagging, by the processor, the potential batch job failure of the batch job queue; and
transmitting, by the processor, a notification advising one or more actions to prevent the potential batch job failure from occurring.

3. The computer-implemented method of claim 2, wherein the one or more actions for preventing the potential batch job failure of selected from the group consisting of terminating batches anticipated to fail, restarting the batches anticipated to fail, placing the execution of the batches anticipated to fail on hold, and fixing the failed process.

4. The computer-implemented method of claim 1, further comprising:
creating, by the processor, a second knowledge base including an archive of successful batch job histories including the time series data of the workflow logs, the messages and the invoked processes associated with successful batch jobs;
detecting, by the processor, an anomaly as a function of comparing the workflow logs, the messages and the process level information of currently processing batch jobs to the archive of successful batch job histories and the archive of failed batch job histories on a per-process basis;
flagging, by the processor, the anomaly at a process level; and
transmitting, by the processor, a notification describing the anomaly at the process level.

5. The computer-implemented method of claim 4, further comprising:
scanning, by the processor, the table of processes for queued batch jobs scheduled to invoke processes affected by the anomaly;
flagging, by the processor, the queued batch jobs scheduled to invoke the processes affected by the anomaly as predicted batch job failures; and
transmitting, by the processor, a notification describing the predicted batch job failures.

6. The computer-implemented method of claim 1, further comprising:
generating, by the processor, time series data from tasks of the batch jobs being executed, capturing code paths invoked by the tasks;
identifying, by the processor, invoked processes of the batch jobs being executed based on the code paths invoked by the tasks;
training, by the processor, an RNN/LSTM model to predict using the time series data, expected process invocations for each of the batch jobs being executed;
scanning, by the processor, the table of processes for the expected process invocations identified by the RNN/LSTM model for the batch jobs being executed and batch jobs present in a batch job queue; and
flagging, by the processor, predicted batch job failures from the batch jobs being executed and the batch jobs in batch job queue, as a function of a combination of the expected process invocations and the archive of failed batch job histories.

7. The computer-implemented method of claim 6, further comprising:
classifying, by the processor, workloads based on time series data from tasks of the batch jobs being executed into workloads that exhibit a linear invocation of processes per task and workloads that exhibit a varying invocation of processes, wherein predicting using the time series data, the expected process invocations for each of the batch jobs being executed workloads is only applied to the workloads that exhibit a varying invocation of processes.

8. A computer program product comprising:
one or more computer readable storage media having computer-readable program instructions stored on the one or more computer readable storage media, said program instructions executes a computer-implemented method comprising:
creating a knowledge base including an archive of failed batch job histories comprising time series data of workflow logs, messages and invoked processes associated with failed batch jobs;
generating a table of processes mapping processes invoked by batch jobs to the workflow logs and messages associated with the batch jobs;

monitoring the messages, the workflow logs and process-level information of the batch jobs being executed;
matching error messages or process failures of a current system log to error messages and the invoked processes of the batch job histories contained in the knowledge base;
displaying a root cause analysis of the error messages or process failures of the current system log and a recommended remediation action for alleviating the batch job failure; and
updating the knowledge base with feedback comprising results of applying the recommended remediation action.

9. The computer program product of claim 8, further comprising:
scanning the table of processes for a potential batch job failure within a batch job queue, wherein the potential job failure is recognized as a queued batch job scheduled to invoke a same failed process as the process failures of the current system log;
proactively flagging the potential batch job failure of the batch job queue; and
transmitting a notification advising one or more actions to prevent the potential batch job failure from occurring.

10. The computer program product of claim 9, wherein the one or more actions for preventing the potential batch job failure of selected from the group consisting of terminating batches anticipated to fail, restarting the batches anticipated to fail, placing the execution of the batches anticipated to fail on hold, and fixing the failed process.

11. The computer program product of claim 8 further comprising:
creating a second knowledge base including an archive of successful batch job histories including time series data of the workflow logs, the messages and the invoked processes associated with successful batch jobs;
detecting an anomaly as a function of comparing the workflow logs, the messages and the process level information of currently processing batch jobs to the archive of successful batch job histories and the archive of failed batch job histories on a per-process basis;
flagging the anomaly at a process level; and
transmitting a notification describing the anomaly at the process level.

12. The computer program product of claim 11 further comprising:
scanning the table of processes for queued batch jobs scheduled to invoke processes affected by the anomaly;
flagging the queued batch jobs scheduled to invoke the processes affected by the anomaly as predicted batch job failures; and
transmitting a notification describing the predicted batch job failures.

13. The computer program product of claim 8 further comprising:
generating, by the processor, time series data from tasks of the batch jobs being executed, capturing code paths invoked by the tasks;
identifying, by the processor, invoked processes of the batch jobs being executed based on the code paths invoked by the tasks;
training, by the processor, an RNN/LSTM model to predict using the time series data, expected process invocations for each of the batch jobs being executed;
scanning, by the processor, the table of processes for the expected process invocations identified by the RNN/LSTM model for the batch jobs being executed and batch jobs present in a batch job queue; and
flagging, by the processor, predicted batch job failures from the batch jobs being executed and the batch jobs in batch job queue, as a function of a combination of the expected process invocations and the archive of failed batch job histories.

14. The computer program product of claim 13, further comprising:
classifying workloads based on time series data from tasks of the batch jobs being executed into workloads that exhibit a linear invocation of processes per task and workloads that exhibit a varying invocation of processes, wherein predicting using the time series data, the expected process invocations for each of the batch jobs being executed workloads is only applied to the workloads that exhibit a varying invocation of processes.

15. A computer system comprising:
a processor; and
a computer-readable storage media coupled to the processor, wherein the computer-readable storage media contains program instructions executing a computer-implemented method comprising the steps of:
creating, by the processor, a knowledge base including an archive of failed batch job histories comprising time series data of workflow logs, messages and invoked processes associated with failed batch jobs;
generating, by the processor, a table of processes mapping processes invoked by batch jobs to the workflow logs and messages associated with the batch jobs;
monitoring, by the processor, the messages, the workflow logs and process-level information of the batch jobs being executed;
matching, by the processor, error messages or process failures of a current system log to error messages and the invoked processes of the batch job histories contained in the knowledge base;
displaying, by the processor, a root cause analysis of the error messages or process failures of the current system log and a recommended remediation action for alleviating the batch job failure; and
updating, by the processor, the knowledge base with feedback comprising results of applying the recommended remediation action.

16. The computer system of claim 15, further comprising:
scanning, by the processor, the table of processes for a potential batch job failure within a batch job queue, wherein the potential job failure is recognized as a queued batch job scheduled to invoke a same failed process as the process failures of the current system log;
proactively flagging, by the processor, the potential batch job failure of the batch job queue; and
transmitting, by the processor, a notification advising one or more actions to prevent the potential batch job failure from occurring.

17. The computer system of claim 15, further comprising:
creating, by the processor, a second knowledge base including an archive of successful batch job histories including time series data of the workflow logs, the messages and the invoked processes associated with successful batch jobs;
detecting, by the processor, an anomaly as a function of comparing the workflow logs, the messages and the process level information of currently processing batch jobs to the archive of successful batch job histories and the archive of failed batch job histories on a per-process basis;

flagging, by the processor, the anomaly at a process level; and transmitting, by the processor, a notification describing the anomaly at the process level.

18. The computer system of claim 17, further comprising:

scanning, by the processor, the table of processes for queued batch jobs scheduled to invoke processes affected by the anomaly;

flagging, by the processor, the queued batch jobs scheduled to invoke the processes affected by the anomaly as predicted batch job failures; and transmitting, by the processor, a notification describing the predicted batch job failures.

19. The computer system of claim 15, further comprising:

generating, by the processor, time series data from tasks of the batch jobs being executed, capturing code paths invoked by the tasks;

identifying, by the processor, invoked processes of the batch jobs being executed based on the code paths invoked by the tasks;

training, by the processor, an RNN/LSTM model to predict using the time series data, expected process invocations for each of the batch jobs being executed;

scanning, by the processor, the table of processes for the expected process invocations identified by the RNN/LSTM model for the batch jobs being executed and batch jobs present in a batch job queue; and flagging, by the processor, predicted batch job failures from the batch jobs being executed and the batch jobs in batch job queue, as a function of a combination of the expected process invocations and the archive of failed batch job histories.

20. The computer system of claim 19, further comprising:

classifying, by the processor, workloads based on time series data from tasks of the batch jobs being executed into workloads that exhibit a linear invocation of processes per task and workloads that exhibit a varying invocation of processes, wherein predicting using the time series data, the expected process invocations for each of the batch jobs being executed workloads is only applied to the workloads that exhibit a varying invocation of processes.

* * * * *